United States Patent
Haas et al.

(10) Patent No.: US 10,346,103 B2
(45) Date of Patent: Jul. 9, 2019

(54) METHOD TO CONFIGURE A CONTROL DEVICE FOR A PRODUCTION SYSTEM

(71) Applicant: Oce Printing Systems GmbH & Co. KG, Poing (DE)

(72) Inventors: Andreas Haas, Armstorf (DE); Harald Keicher, Isen (DE); Norbert Linkel, Isen (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 593 days.

(21) Appl. No.: 14/964,877

(22) Filed: Dec. 10, 2015

(65) Prior Publication Data

US 2016/0170388 A1   Jun. 16, 2016

(30) Foreign Application Priority Data

Dec. 10, 2014   (DE) .......................... 10 2014 118 290

(51) Int. Cl.
*G05B 15/02*   (2006.01)
*G06F 3/12*    (2006.01)
(Continued)

(52) U.S. Cl.
CPC ............ *G06F 3/121* (2013.01); *G06F 3/1229* (2013.01); *G06F 3/1282* (2013.01);
(Continued)

(58) Field of Classification Search
CPC ...... G06F 3/121; G06F 3/1229; G06F 3/1234; G06F 3/1282; G06F 3/1203; G05B 15/02;
(Continued)

(56) References Cited

U.S. PATENT DOCUMENTS

| 4,812,842 A | 3/1989 | Bayerlein et al. |
| 6,724,494 B1* | 4/2004 | Danknick .............. G06F 3/121 358/1.14 |

(Continued)

FOREIGN PATENT DOCUMENTS

| DE | 3614744 C2 | 11/1987 |
| DE | 29720991 U1 | 1/1998 |

(Continued)

OTHER PUBLICATIONS

IPSWITCH WhatsUpGold—IT Management Made Simple—Unified Availability & Performance Monitoring—Copyright © 2015 (English & German language versions).

*Primary Examiner* — Shahed Ahmed
(74) *Attorney, Agent, or Firm* — Schiff Hardin LLP

(57) ABSTRACT

In a method to configure a controller for a production system including multiple components that respectively including a client computer connected via data connections with a main computer, the components connected to the data network are scanned to obtain scanned information. A network map is created using the scanned information. The network map can include the main computer, the data connections and the components. The controller can be configured according to specifications of the created network map. Monitoring routines that are specific to the respective components can be executed. Upon the scanning of the components, operating system functions at the client computers are exclusively called so that software modules specifically for the scanning must not be present at the client computers.

22 Claims, 15 Drawing Sheets

(51) Int. Cl.
*H04L 29/08* (2006.01)
*H04L 12/24* (2006.01)
*H04L 12/26* (2006.01)

(52) U.S. Cl.
CPC .......... *H04L 41/0677* (2013.01); *H04L 41/12* (2013.01); *H04L 43/14* (2013.01); *H04L 67/34* (2013.01); *H04L 67/36* (2013.01); *G06F 3/1203* (2013.01); *H04L 41/0213* (2013.01); *H04L 67/025* (2013.01)

(58) Field of Classification Search
CPC ..... H04L 41/0677; H04L 41/12; H04L 43/14; H04L 67/34; H04L 67/36; H04L 41/0213; H04L 67/025
See application file for complete search history.

(56) References Cited

U.S. PATENT DOCUMENTS

| | | | |
|---|---|---|---|
| 6,813,047 B1 * | 11/2004 | Murbach | H04N 1/00132 348/96 |
| 7,478,145 B2 | 1/2009 | Braun et al. | |
| 7,663,771 B2 | 2/2010 | Czotscher et al. | |
| 8,286,247 B2 | 10/2012 | Haaf et al. | |
| 8,296,414 B1 * | 10/2012 | Wood | H04L 67/34 709/223 |
| 8,509,656 B2 | 8/2013 | Kopp | |
| 8,737,885 B1 | 5/2014 | Berg | |
| 2013/0169987 A1 * | 7/2013 | Akiyama | G06F 9/44505 358/1.13 |
| 2013/0212443 A1 * | 8/2013 | Ikegami | G06F 1/206 714/57 |
| 2015/0382136 A1 * | 12/2015 | Mihira | H04W 12/06 455/41.1 |

FOREIGN PATENT DOCUMENTS

| | | |
|---|---|---|
| DE | 10204826 A1 | 8/2003 |
| DE | 102004029646 A1 | 12/2005 |
| DE | 102006022710 A1 | 11/2007 |
| DE | 102008048256 A1 | 4/2010 |
| DE | 102009060334 A1 | 6/2011 |
| DE | 102010015985 A1 | 9/2011 |
| DE | 102012016653 A1 | 2/2014 |
| DE | 102012111791 A1 | 6/2014 |
| EP | 1691269 A1 | 8/2006 |
| WO | 2004055609 A2 | 7/2004 |

\* cited by examiner

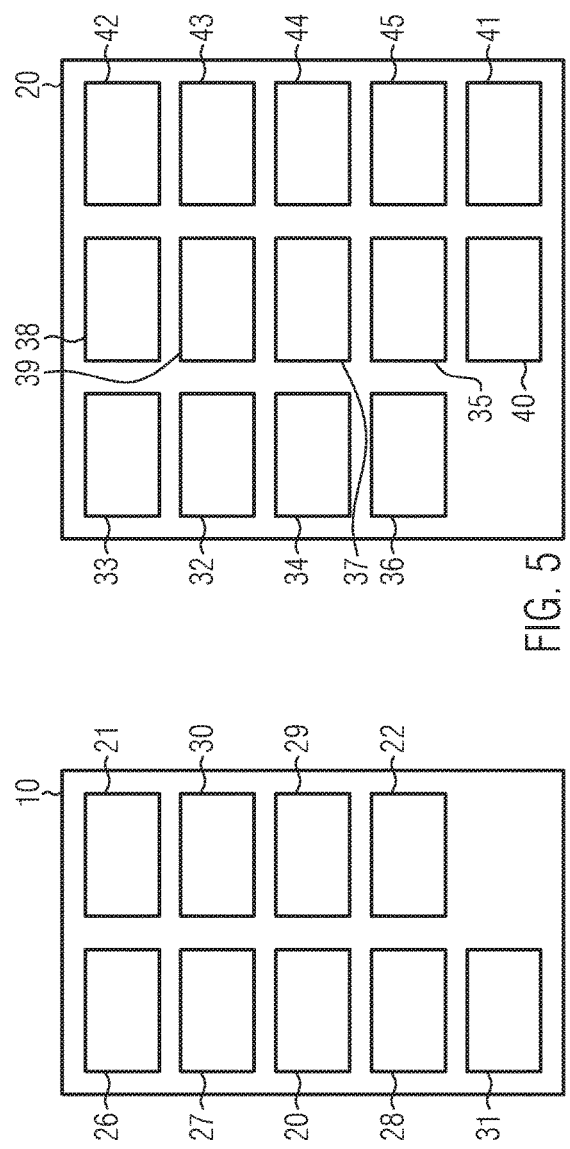
FIG. 5
FIG. 4
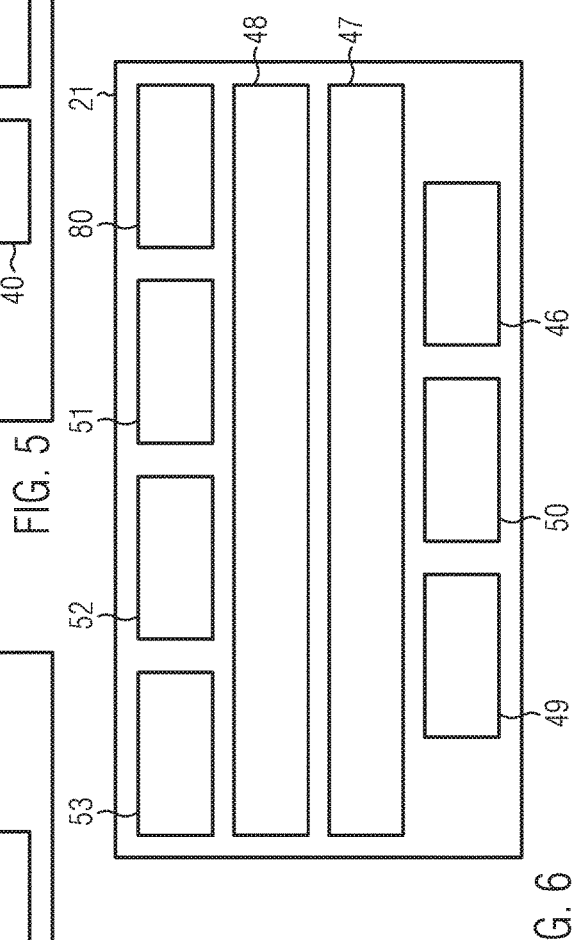
FIG. 6

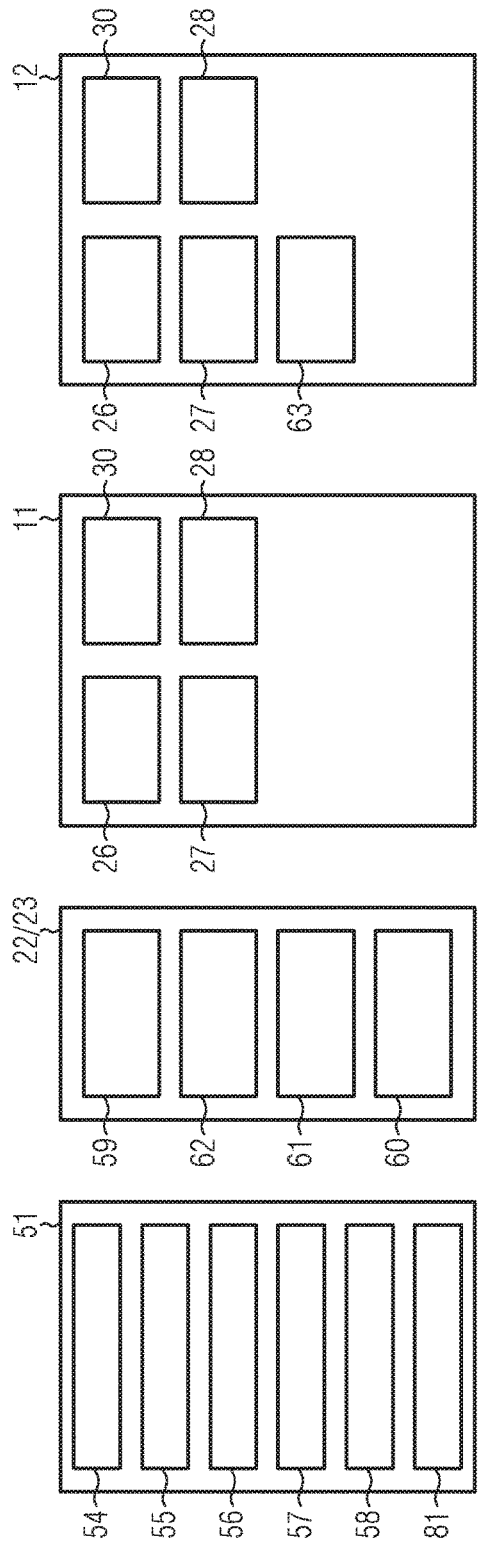

| SCAN NETWORK | | | |
|---|---|---|---|
| Status | Output | Plugin data | |

| Host | IP address | Parent | Type |
|---|---|---|---|
| Blade01 | 193.138.17.11 | | HpServerNoRaid |
| Blade09 | 193.138.17.19 | | HpServerNoRaid |
| Blade17 | 193.138.17.27 | | HpServerNoRaid |
| Blade18 | 193.138.17.28 | | HpServerNoRaid |
| Blade25 | 193.138.17.35 | | HpServerNoRaid |
| Blade26 | 193.138.17.36 | | HpServerNoRaid |
| BladeRunner | 193.138.17.10 | | HpServerRaid |
| BladeRunner2 | 193.138.17.50 | | HpServerRaid |
| Muc01 | 193.138.17.91 | | HpServerRaid |
| Muc02 | 193.138.17.92 | | HpServerRaid |
| Muc04 | 193.138.17.94 | | HpServerRaid |
| Muc05 | 193.138.17.95 | | HpServerRaid |
| OA | 193.138.16.140 | | HpOa |
| OA2 | 193.138.16.180 | | HpOa |
| PowerControlIface|LO | 193.138.16.134 | | OpsCtrlPci |
| Switch1 | 193.138.17.253 | | HpSwitch1810 |
| Switch1Encl1 | 193.138.16.252 | | HpSwitch6125G |
| Switch2 | 193.138.16.250 | | HpSwitch1810 |

FIG. 16

| SCAN NETWORK | | | |
|---|---|---|---|
| Status | Output | Plugin data | |
| | | | PN | Integrated Lights-Out 4 (iLO 4) |
| | | | FWRI | 1.30 |
| | | | iloip | 193.138.16.141 |
| | | | SBSN | CZ234101WQ |
| | | | SystemName | ProLiant BL420c Gen8 |
| | | valuelist | SN | ILOCZ234101WQ |
| | | | BBLK | 03/11/2012 |
| | Blade01 | | HWRI | ASIC: 16 |
| | | | SPN | ProLiant BL420c Gen8 |
| | | address | | 193.138.17.11 |
| | | hostname | | Blade01 |
| | | iloaddress | | 193.138.16.141 |
| | | type | | HpServerNoRaid |
| | | | PN | Integrated Lights-Out 4 (iLO 4) |
| | | | FWRI | 1.30 |
| | | | iloip | 193.138.16.149 |
| | | | SBSN | CZ234101WQ |
| | | | SystemName | ProLiant BL420c Gen8 |
| | | valuelist | SN | ILOCZ234101WX |
| | | | BBLK | 03/11/2012 |
| | Blade09 | | HWRI | ASIC: 16 |
| | | | SPN | ProLiant BL420c Gen8 |
| | | address | | 193.138.17.19 |
| | | hostname | | Blade09 |
| | | iloaddress | | 193.138.16.149 |
| | | type | | HpServerNoRaid |

FIG. 17

| Parameter | Description |
|---|---|
| -V (--version) | The version of the plugin |
| -h (--help) | The help for the plugin and overview of all call parameters |
| -t (--timeout) | Specify a timeout for running time of the plugin |
| -w (--warning) | Threshold for warning status |
| -c (--critical) | Threshold for critical status |
| -H (--hostname) | Host name of the host to be checked by the plugin. Ether the DNS name of the host or its direct IP address can be specified here. |
| -v (--verbose) | Detailed output of information for error analysis |
| -s (--simulation) | The plugin supplies "fake" data that for integration |

FIG. 18

| Parameter | Description |
|---|---|
| -C (--community) | Name of the SNMP community |
| -a (--authentication) | Password for user authentication |
| -l (--logname) | Login name for user authentication |
| -p (--port oder --passwd oder --password) | Specify a port number or a password for authentication; different usage. |
| -u (--url oder --username) | Specify a URL or a user name for authentication; different usage. |

FIG. 19

| Range definition | Alarm if x ... |
|---|---|
| 10 | < 0 or > 10, (outside of the range from {0 .. 10}) |
| 10: | < 10, (outside of the range from {10 .. infinity}) |
| ~:10 | > 10, (outside of the range from {-infinity .. 10}) |
| 10:20 | < 10 or > 20, (outside of the range from {10 .. 20}) |
| @10:20 | >= 10 and <= 20, (in the range from {10 .. 20}) |

FIG. 20

| Command line | Description |
|---|---|
| check_stuff -w 10 -c 20 | Critical if "stuff" is greater than 20, otherwise warn if greater than 10 (moreover critical if "stuff" is less than 0) |
| check_stuff -w ~:10 -c ~:20 | The same as above, but OK if "stuff" is less than zero! |
| check_stuff -w 10: -c 20 | Critical if "stuff" is greater than 20, otherwise warn if "stuff" is less than 10 (moreover critical if "stuff" is less than 0) |
| check_stuff -c 1: | Critical if "stuff" is less than 1 |
| check_stuff -w ~:0 -c 10 | Critical if "stuff" is greater than 10; warn if "stuff" is greater than 0 |

FIG. 21

METHOD TO CONFIGURE A CONTROL DEVICE FOR A PRODUCTION SYSTEM

BACKGROUND

Embodiments descried herein generally relate to a method to configure a control device for a production system, in particular for a printing system, and such a production system.

DE 297 20 991 U1 and DE 36 14 744 C2 describe systems having multiple computers that may communicate with one another.

Furthermore, network analysis apparatuses are known that may be connected in a defined network and that analyze communications executed over data lines of a network. The functionality of a data network is checked with such network analyzers, wherein only a small section of the data network is tested.

Ipswitch Inc., USA has designed monitoring software, under the product name WhatsUp Gold, to monitor computing centers and networks with 25 to 20,000 systems. All resources may hereby also be detected automatically and a map of their connections may be created. Active and passive monitoring technologies are used to monitor the individual computers. Furthermore, automatic alarms may be output upon errors.

Production systems are increasingly being individually designed. Earlier it was typical that, for specific types of high-capacity printers, a specific configuration had been manufactured and sold in multiple hundreds, and in some cases even a few thousands. It is becoming more common that a specific configuration of a high-capacity printing system is manufactured and sold a few tens of times, or even is individually assembled from predetermined components.

Production systems normally have a main computer on which control software is executed, with which control software the individual components of the production system are controlled. For each configuration of the production system, the control software is adapted and tested so that a certain operation of the production system is ensured.

The main computer and control computer of the individual components of such a production system may be specially developed microcontrollers. However, standard computers are increasingly used since these provide a greater computing power for significantly lower costs. However, given standard computers the problem exists that the generation cycle is normally not longer than one to two years. The overlap time between individual generations is often very short (for example <3 months). In addition to this, specific standard computer generations are only suitable for specific operating systems, such that the generation cycle of the hardware also requires a correspondingly short generation cycle of the software. In particular, it is typical to provide the hardware with new software versions of the operating system within even shorter intervals (for example 2 months), such that computers of the same hardware generation may have different operating system software. These computers are provided for pure computation operation in computing centers and in offices, but not for controlling production systems that are in operation continuously for multiple years and also need to be reliably serviced over the service life. Interruptions of the operation of a production system often incur high downtime costs.

A manufacturer of a production system may circumvent these problems in that he purchases and stores a large quantity of a computer of a specific type. However, this is not practical for the entire generation of a production system that is offered for multiple years, since it cannot be predicted what quantities of the production system are reached in the following years. A manufacturer of a production system is therefore forced to use a new computer generation at least after a couple of years.

An additional problem of such a generation change of the computer in a production system lies in that the computers communicate with the machine components of the production system via corresponding interfaces in order to control said machine components and/or read out operating parameters from these. Given a generation change of the computers, the corresponding interfaces also sometimes change, such that the control of the machine components of the production system no longer functions. The problems with the interfaces are very diverse, since only specific functionalities of the interfaces change, functions or interfaces cease to exist entirely, or the structure of the apparatus changes completely and is no longer compatible with the predecessor model. The adaptation of the machine components to a new computer generation incurs a significant effort, and therefore high costs.

Manufacturers of production systems often stock up on a large number of corresponding computers if the manufacturer of the computer announces that the corresponding model will be discontinued soon. This is tied to significant costs and requires storage space at the manufacturer of the production apparatuses.

Manufacturers of production systems therefore must decide whether they want to accept the advantage of the favorable computing power of standard computers with the disadvantage of the short generation cycles, or use special microcontrollers which have a lower computing power but are available over a longer time period. A production system that could be quickly and simply adapted to a new computer generation of standard computers would be very advantageous.

SUMMARY

It is an object to provide a method and a device to configure a control device for a production system with which the control device may be quickly and simply provided for differently configured production systems or printing systems.

It is also an object to provide a system and a method for monitoring production systems with which components and corresponding monitoring software from third parties may be integrated.

An additional object is to provide a system to depict control apparatuses in a production system.

In a method to configure a controller for a production system including multiple components that respectively including a client computer connected via data connections with a main computer, the components connected to the data network are scanned to obtain scanned information. A network map is created using the scanned information. The network map can include the main computer, the data connections and the components. The controller can be configured according to specifications of the created network map. Monitoring routines that are specific to the respective components can be executed. Upon the scanning of the components, operating system functions at the client computers are exclusively called so that software modules specifically for the scanning must not be present at the client computers.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 illustrates a view of a digital printer with an example configuration of the digital printer according to an exemplary embodiment of the present disclosure.

FIG. 2 schematically illustrates a printing apparatus, a control device and devices connected thereto according to an exemplary embodiment of the present disclosure/

FIG. 3 schematically illustrates a main computer of a control device and client computers connected with the main computer according to an exemplary embodiment of the present disclosure.

FIG. 4 through FIG. 14 schematically illustrate components of a control device and client computers according to exemplary embodiments of the present disclosure.

FIG. 16 illustrates a list of the automatically detected components according to an exemplary embodiment of the present disclosure.

FIG. 17 illustrates detail information of components of the list from FIG. 6.

FIG. 18 illustrates a table with call parameters of plugins according to an exemplary embodiment of the present disclosure.

FIG. 19 illustrates a table with additional call parameters of the plugins according to exemplary embodiments of the present disclosure.

FIG. 20 illustrates examples of range definitions given a call of a plugin according to exemplary embodiments of the present disclosure.

FIG. 21 illustrates command lines for the calling of a fictional plugin in a tabular arrangement according to an exemplary embodiment of the present disclosure.

Figure 1:
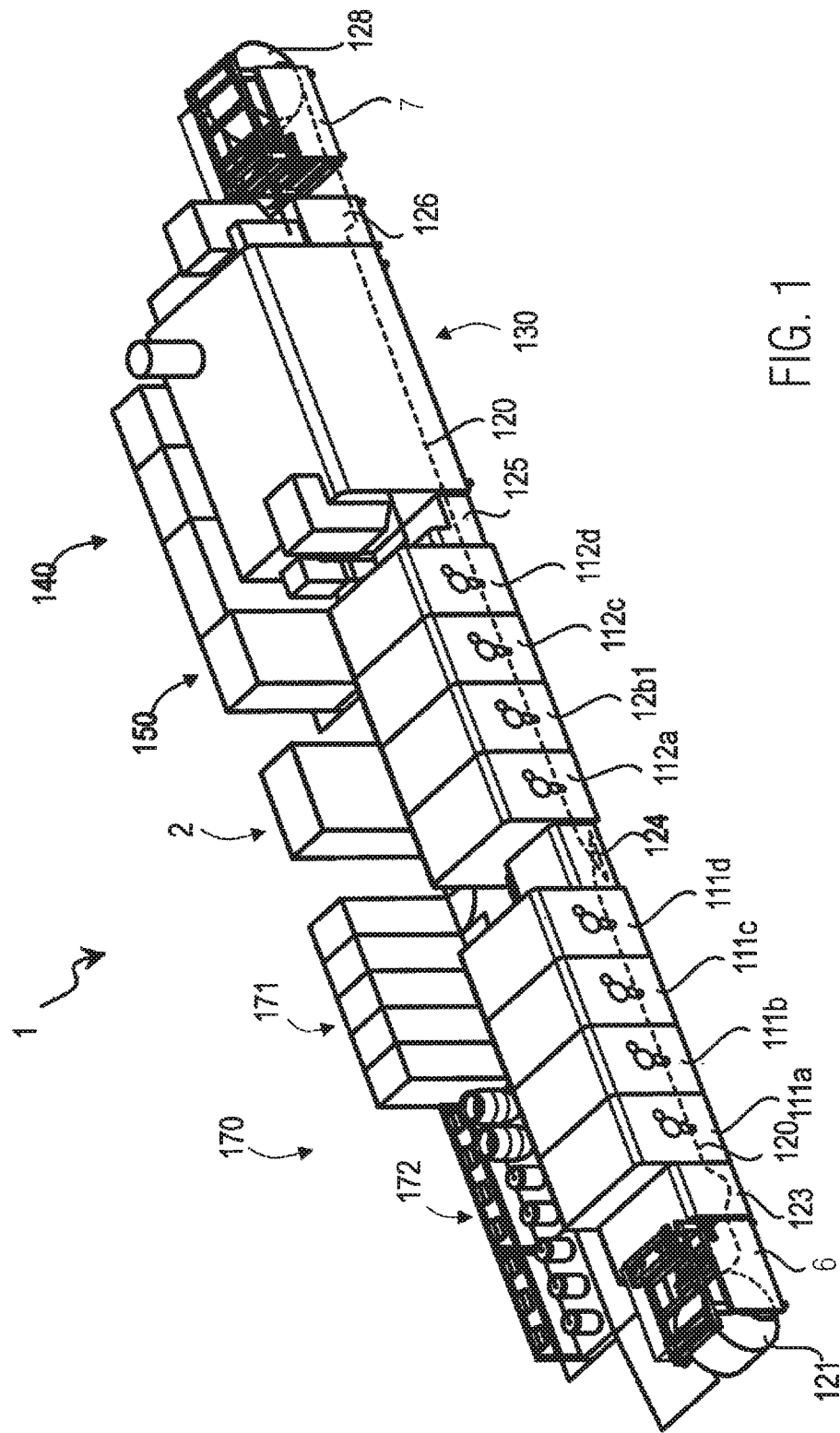

The exemplary embodiments of the present disclosure will be described with reference to the accompanying drawings.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

In an exemplary embodiment, a method for configuring a control device for a production system (in particular for a printing system), wherein the production system has multiple components that are respectively provided with a client computer, which client computers are connected with a main computer via data connections, includes the following steps:

scan the individual components, create a network map using the scanned information, wherein the network map includes the main computer, the data connections and the components, and configure the control device according to the specifications of the created network map, wherein specific monitoring routines are executed for the respective components.

In an exemplary embodiment, via the automatic scanning of the individual components of the production system and the creation of a network map using the scanned information, the control device may be configured entirely automatically according to the specifications of the created network map. It is hereby not necessary that control software be manually adapted to different configurations of the production system. Specific monitoring routines that are executed automatically are provided for the respective components.

In an exemplary embodiment, the monitoring routines serve on the one hand to monitor the functionality of the client computer of the individual components and the functionality of the components themselves, for example print groups, conditioning group, turner, register, puller, fixer, climate controller, fluid controller or their sub-components, such as blowers, rollers, drives etc.

In exemplary embodiments, client computers are computers and microprocessor systems that are provided in a production system and are connected directly or indirectly with the main computer via data connections. The client computers may be designed with data connections of a single network type, for example Ethernet. However, the data connections may be based on different network types, for example Ethernet, CAN bus. Infinibus etc.

In an exemplary embodiment, the scanning of the components takes place in two stages, wherein basic information—for example MAC addresses, ARP lists, presence of remote maintenance functionality, switch ports, component ID—is determined first. In a second step, detail information of the individual components is then determined, wherein a communication with the individual components is executed using the determined basic information (such as addresses and identifications specific to the respective components) in order to read out the detail information.

The method according to an exemplary embodiment can be designed such that, upon scanning the components, exclusively either standard functions (in particular operating system functions) at the client computers are called or the messages transmitted via the data connections are analyzed. It is hereby unnecessary that software modules specific to the client computers must be set up and executed at these in order to scan said client computers. Typical standard functions are, for example, ping requests. If computers are connected with one another via data connections, there is always a certain system communication. This system communication may be "monitored" and analyzed, wherein information specific to the data network can be derived from this. Such a method has the advantage that the components that are integrated into the production system do not need to be prepared with a special software package.

According to one development of the method according to an exemplary embodiment, a control panel is configured according to the specifications of the created network map. With the control panel, it should be possible for a user to view the functionality of the individual components and hereupon affect them, if applicable, in the event that the user possesses the corresponding rights.

In an exemplary embodiment, the configuration can take place by means of predetermined templates for the individual components of the production system. The templates are associated with components using identifiers that are specific to said components, which identifiers have been determined upon the scanning of the individual components. Many different components may be provided for a production system: however, the number of components is limited, even if it is large. A corresponding template is to be established only once for each component that is approved for installation in the production system. The template normally includes a monitoring routine specific to the component and control parameters that are to be complied with during operation. Furthermore, the template may include configuration parameters that define the functionality of the component depending on its position in the entire production system. A blower that is used to cool a computer and to cool a sensor device may thus be configured differently depending on whether it is installed in the computer or in the sensor device.

In an exemplary embodiment, if a component for which no template is present is detected upon scanning of components, this component may then be identified as an unknown component. Via the identification of an unknown component, a routine to analyze said unknown component may be started. For example, a serial number or other information of the component is read out with this routine. Additional information regarding the component may then be determined with an automatic search on the Internet. This information is provided to the operator, who may then decide whether this component may remain in the production system. If specific information of components is not available, it may also be appropriate to disconnect these components from the data network via interruption of the corresponding data connection, or to generally disconnect unknown components from the data network.

According to a development of the method according to an exemplary embodiment, the data network may be tested automatically for network conflicts, i.e. address conflicts. The network conflicts may be corrected automatically. For example, network addresses are reassigned. On the other hand, network conflicts may also be corrected in that conflict-causing components are automatically disconnected from the network.

In an exemplary embodiment, the scanning of the components can be executed by means of a web user interface plugin provided at the main computer. Via the use of such web user interface plugins, the corresponding plugins may be retroactively added for specific components or groups of components as soon as the components are approved for installation in the production system. The system is hereby of modular design and may be expanded at any time.

In an exemplary embodiment, the configuration can be executed by a web user interface arranged at the main computer. The scanning of the components may be executed repeatedly. Network maps are hereby generated repeatedly. These network maps may be archived in order to document changes and developments at the production system.

In an exemplary embodiment, the network maps may be exported. Different data of the network maps may hereby be filtered. For example, an export of the network maps for a service technician may be provided that lists the operating times and/or the number of produced units (for example printed pages) for the respective components. Error messages may be included so that a service technician immediately recognizes which component is to be repaired or serviced. On the other hand, with an export data may be output that are important for accounting and/or service agreements that describe the use of the individual components or the consumption of materials. For the plant management, the network map may be exported together with statistical data that describe the reliability of the individual components.

In an exemplary embodiment, the control device may be designed such that operation-specific parameters of the components are read out. Such operation-specific parameters are, for example, the number of processed product units, for example the number of printed pages, the operating hours, the consumed material etc. These operation-specific parameters may be used in order to monitor the individual components. These parameters may also be analyzed and made available for additional applications.

An additional aspect of the present disclosure concerns a method to check the configuration of a production system, in particular of a printing system, wherein the production system comprises multiple components that respectively have a client computer, which client computers are connected with a main computer via data connections, and the components have one or more exchangeable modules. The method includes the steps of scanning the individual components connected to the data network, and reading out statistical parameters of the individual components and modules, and identifying the components and/or modules using the statistical parameters.

In an exemplary embodiment, different parameters may be read out from the individual components and modules. There are dynamic parameters—for example the temperature—which may change during operation. On the other hand, there are static parameters that are always constant. Such static parameters are, for example, a component ID or version number of the individual parts of the component or of the module, for example of firmware, of a kernel or of integrated circuits, processors, in particular of a CPU and additional connected devices. Furthermore, type designations—information that describe the design and configuration (settings) of the component and of the module, such as the available storage regions, the clock frequency that is used, the number of ports etc.—which are static parameters may be read out.

These static parameters are typical of the respective component or of the respective module and represent a kind of fingerprint of the type of component or of the type of module.

The type of the respective component or of the respective module may be unambiguously identified using these static parameters.

In an exemplary embodiment, this identification allows an automatic and reliable checking of the configuration of the production system. For this, only the detected static parameters of the respective modules and/or components that have been detected are compared with corresponding static parameters of a reference database.

In an exemplary embodiment, the reference database includes a set of static parameters of all components and/or modules of the production system. This set of static parameters (which is designated as a reference set in the following) may be composed once via the automatic scanning of the individual components (as explained above) and be stored in the database. With this it may be checked at any time whether a correct configuration of the production system is present.

In an exemplary embodiment, individual components and/or modules may be exchanged for other corresponding components and/or modules without the function and operation of the production system being negatively affected. If such exchangeable components and/or modules are known, these may be taken into account in the creation of the reference database and/or in the comparison of the detected sets of static parameters with the reference database. The reference database may include the sets of static parameters of the exchangeable components and/or modules or—upon establishment of a deviation relative to the reference database—it may be checked in an additional step whether the deviating set of static parameters is to be associated with an exchangeable component and/or an exchangeable module. In an exemplary embodiment, a configuration of the deviating component and/or of the deviating module is implemented, or this is to be assessed as a configuration conflict, only if the deviating set of static parameters is not to be associated with an exchangeable component and/or an exchangeable module.

In an exemplary embodiment, if the deviating component and/or the deviating module is a component and/or module that does not negatively affect the function and operation of the production system, after a corresponding testing the set of static parameters of the deviating component and/or of the deviating module may be stored as part of the configuration in the reference database. The reference database is hereby adapted to the new state.

Furthermore, it is possible to check whether a suitable configuration template for the deviating component or the deviating module is present, and to configure the production system with the aid of the configuration template so that the deviating component or the deviating module is integrated into the production system.

In an exemplary embodiment, if a deviating component or the deviating module is established that can be exchanged or is to be configured by means of a configuration template without negatively affecting the function and the operation, the exchange of the component and/or of the module is stored in a log file. Furthermore, the exchange of the component and/or of the module can be reported to a predetermined location. For example, the predetermined location is an operator of the production system who is informed (via a display at the control panel) about the exchange of the component and/or of the module, or is a service organization which is responsible for servicing the production system. Based on this report, the service organization is on the one hand always informed about the current configuration of the production system, and also may immediately take corresponding measures given an unauthorized exchange of components and/or modules.

In an exemplary embodiment, a deviation from the predetermined configuration may in principle be assessed as a configuration conflict. However, a deviation from the predetermined configuration may also be assessed as a configuration conflict only if the deviation is based on an unexchangeable component and/or an unexchangeable module and/or an unconfigurable component and/or an unconfigurable module.

In an exemplary embodiment, if a configuration conflict is established, one or more of the following steps may then be executed:
report the configuration conflict;
disconnect the deviating component from the production system;
separate the deviating component into a virtual network;
change the operating mode of the production system.

In an exemplary embodiment, the configuration conflict may be reported to the operator and/or an organization responsible for the service of the production system. This report may be sent via a display at the control panel or via a separate message: per SMS, e-mail or via another communication means.

In an exemplary embodiment, a deviating component may also be disconnected from the production system. This is primarily appropriate if an unauthorized computer or microprocessor is detected in the data network of the production system.

The deviating component may also be automatically separated into a virtual network. Address conflicts may be corrected with this, and the access capabilities of the deviating components to the production system may be limited. For example, such a deviating component may only be granted read rights, such that it is ensured that the deviating component may not cause any change to the production system.

In an exemplary embodiment, the changing of the operating mode of the production system is primarily appropriate when a deviating component is established that is of fundamental importance to the production operation, such that the operating mode is modified such that the additional production is possible even without the deviating component. For example, the production speed may be decreased. If the production system is a printing system for two-sided printing to a recording medium, and if a deviation is established in a print group for only one side of the recording medium, the operating mode may then be limited to a one-sided printing.

In exemplary embodiments, software components to be installed on the production system may have dependencies on hardware components and/or other software components present in the production system. In order to be able to resolve such dependencies, the method for checking the configuration of a production system may be expanded such that it includes the following steps:
import a software package that includes a new software component to be installed.
extract, from the imported software package, dependencies of the new software component to be installed on other software and hardware components,
using the static parameters, check whether the software and hardware that are necessary for the new software component to be installed are present in the production system.

In addition to the software to be installed, included in a software package is information that further describes the software. In particular, such information includes the dependencies regarding other software components or software packages and/or hardware components. These dependencies thus no longer need to be resolved by an installing service technician; rather, before the installation of the software component a check is made as to whether the necessary software and hardware is present in the production system.

It is thereby enabled to implement the installation of the software components of the production system efficiently and without error.

In one or more exemplary embodiments, the term "software" includes all software that is executable and executed in the production system, in particular application software, operating system software and firmware of the components present in the production system.

The method may additionally be expanded in that software components that are not present in the production system, on which software components the new software component that is to be installed depends, are installed automatically before the installation of the new software component.

The installation of a production system is implemented significantly more quickly and efficiently via the automatic installation of required software components.

The static parameters—using a check which is made as to whether the software and hardware that are necessary for the new software component that is to be installed are present in the production system—may be read out from a network map created with the aid of said static parameters.

The method may additionally be expanded such that each change to the software components installed in the production system, which change is made due to installation of a software component, is logged. If needed, every change that is made may be completely reverted so that a previous state of the software components is reestablished.

Via the recording of the changes made in a software installation, it is enabled that it is possible to quickly and simply return to a previous software state for which it is known that the production system functions correctly with this software state.

An additional advantage is that such a method for software administration may be triggered remotely, such that information or de-installation of software components may be implemented without the installing service technician being on site.

An additional aspect of the disclosure concerns a system for monitoring a production system, in particular a printing system comprising a printing apparatus and a control device that has multiple components, wherein the individual components and groups of components have different monitoring program modules, said system comprising:

interfaces for the monitoring program modules for transmitting status data of the components and/or component groups, and an evaluation device to record and associate the respective status data as parameter values with respective specific parameters of a parameter set of the monitoring system, wherein status data of different monitoring program modules may be associated with the same parameters; and to check the parameter values, wherein predetermined deviations are assessed as errors.

In an exemplary embodiment, components are all parts of the production system that have a client computer that is connected directly or indirectly with the main computer via data connections, and that thus may be contacted via an IP address.

Via the provision of interfaces for the monitoring program modules, the possibility is achieved to efficiently and cost-effectively integrate monitoring program modules (in particular from third-party vendors) into the production system for its monitoring. It is hereby enabled that it is possible to use the monitoring program modules without needing to change these programmatically in terms of their output or their other functions. Only the interfaces are to be adapted in order to transmit status data of the components and/or component groups via these interfaces.

From the status data passed via the interfaces, parameter values are extracted that are associated with specific parameters of the monitoring system in order to be able to process these further. In particular, in the further processing the parameter values are checked in order to establish errors occurring in the production system.

The parameters describe properties of the production system and have parameter values. The parameter values thereby include numerical values and logical values.

An error that has occurred may negatively affect the correct and/or efficient functioning of the production system. The types of errors and their degrees are explained in more detail further below.

In a further embodiment, the evaluator is designed such that it accesses stored component data that, for every component of the production system, describe the design of the component in modules, and it associates the errors with the respective modules. A component is thereby made up of one or more modules, and a module is an exchangeable unit.

In one or more exemplary embodiments, a module may in turn comprise additional (sub-)modules. Component data are hierarchically structured data that describe the design of the components from modules and the (sub-)modules. This means that the component data associate modules with a component or a module.

If a component now exhibits an error, the modules from which the component is fashioned may be identified with the component data. The evaluator may conclude the faulty modules or faulty (sub-)modules of the component via the interpretation of the transmitted status data. Should the status data be insufficient for this, the evaluator may request additional status data, in particular status data of individual modules and/or individual (sub-)modules from the monitoring program modules monitoring the component.

A fast and efficient isolation of the error of a faulty component is provided via the identification of the module to be exchanged. The preparation for an error correction is thereby accelerated since the faulty module for the component may be determined and relayed.

According to an additional aspect of the present disclosure, a method is provided for monitoring a production system, in particular using a monitoring system as explained above.

The monitoring method thereby includes the steps:

record status data of components and/or component groups of a production system, associate the status data as parameter values with respective, specific parameters of a parameter set of the monitoring system, wherein different status data may be associated with the same parameter, and check the parameter values, wherein predetermined deviations are assessed as errors.

In exemplary embodiments, different monitoring program modules may have different methods in order to status data of the components and/or component groups. Via the execution of these different methods for the same parameters, the problem may hereby occur—due to measurement errors or measurement tolerances—that the status data passed by the monitoring program modules enable contradictory conclusions as to whether an error is present or not.

In an exemplary embodiment, all status data of the different monitoring program modules are initially stored, and all status data for a same parameter are associated with this parameter in order to be able to further process the status data determined with different methods.

In an exemplary embodiment, upon execution of the monitoring method, an error is detected if different parameter values are transmitted for the same parameter and at least one of these parameter values has a predetermined deviation that is assessed as an error.

The parameter values may include numerical values or logical values. Logical values may be represented as numbers "0" or "1", or as a string ("correct", "false", "true" etc.). Given numerical values, an error is normally detected if it lies outside of a predetermined numerical range. Given logical values, an error is detected if it differs from a predetermined logical value.

In that multiple parameter values that can be associated with the same parameter may be extracted from the status data, and if at least one of these parameter values represents an error, this is assessed overall as an error, which ensures that it is sufficient for a detection of an error if only one of these parameter values exhibits the predetermined deviation. In order to now be able to reliably detect an error, an error is detected if only one parameter value from one of the monitoring program modules already exhibits the predetermined deviation.

With the aid of the status data, component errors and/or errors of application software of the production can be detected. All occurring error types are registered via the monitoring method.

In an exemplary embodiment, a component error is any error in a component, with the exception of an error of a module of the application software that is executed at this component. Errors of the application software have their origin in the respective application software, thus are triggered by this.

In an exemplary embodiment, the monitoring method is designed to relay a detected error automatically to an external service organization for error correction.

In an exemplary embodiment, an automatic relaying can include an error report that is sent via e-mail, SMS, fax or another suitable communication channel. The relaying thereby takes place to an external service organization trained for error correction of the production system, wherein "external" means outside of the production system. Via the automatic error reporting, such an organization may be quickly notified of an error so that an error correction is enabled efficiently and on schedule. In principle, errors may also be reported to an operator.

In an exemplary embodiment, in the event that it has detected an error, the monitoring method is designed to associate an error priority for error correction with this error according to predetermined criteria. The error priority thereby describes what influence the error has on the production process of the production system.

With regard to the error priority, the errors can be classified into warnings or errors of low error priority, errors of medium error priority and errors of high error priority. The error priority may also be subdivided differently into multiple levels.

The warnings are errors of a low error priority that do not immediately negatively affect the operation of the production system. However, warnings may develop further in the future such that a negative effect on the operation occurs due to an error.

The errors of medium error priority are errors that negatively affect the production operation but do not entirely prevent it.

The errors of high error priority are errors given whose occurrence the production operation can no longer be maintained.

In an exemplary embodiment, a service can be coordinated using the error priority, wherein the error priority describes with what precedence the error is to be corrected. Due to the relaying of the error priority, given warnings and/or errors the possibility arises for the external service organization responsible for the error correction to allocate the service forces that are present for error correction to the individual error messages efficiently. Errors with high error priority are accordingly given preference, and available service forces are initially used for their correction. Only if the errors with high error priority have been discharged is the correction of errors of medium or low error priority or of warnings of the same or other production systems executed. A more efficient production operation is thereby ensured, even given a plurality of production systems overseen by the service organization.

In an exemplary embodiment, the response times of the guarantee or service agreements and/or an error certainty (which is explained in detail below) may additionally be taken into account in the service coordination in that these are linked with the error priorities. Via the consideration of the service or guarantee agreements, it may be ensured that—given a limited service capacity—a service or a maintenance for a production system for which a value is placed on an unimpeded and interruption-free operation is implemented as promptly as possible, whereas—given a production system that has lower requirements—errors with lower error priority and warnings are discharged with lower precedence.

In an exemplary embodiment, a planning of the service operations is similarly accelerated since a downstream system for service coordination may automatically implement the service coordination by taking into account the criteria described above, and thus may even automatically control the service operations.

According to an exemplary embodiment, the monitoring method is designed to display the components, the component groups, modules, the status data, the parameters and/or the parameter sets, together with the respective errors, at the control panel at one of the computers. A component is thereby made up of one or more modules, and a module is an exchangeable unit of a component. A module may in turn comprise additional modules. These relationships between components and modules have already been described above.

Via the display, it is enabled for an operator at the control panel to receive an overview of the production system. In particular, the operator may quickly and efficiently perceive errors that are thereby occurring.

In an exemplary embodiment, the display takes place as a structured, in particular hierarchical and/or graphical presentation. The depicted structure hereby represents the network map or a section thereof.

Via a structured presentation in the form of a network map, the operator at the control panel may be quickly and efficiently informed about an occurred error in an overview of the production system with associated network, even given complex production systems. The complete production system is hereby displayed as an uppermost level on the display device, wherein the different error types and/or error priorities are depicted via an optical display at the depicted objects (i.e. the devices, installations, components and/or modules) so as to be differentiable (via coloring of the object, for example).

A level thereby represents a logical map of the objects present in a production system, such as components, modules, installation, devices. The represented objects of a superordinate level hereby include objects of a subordinate level that are arranged hierarchically on a lower level from it.

Via the graphical depiction, it is enabled for the user of the control panel to have the next lowest presentable level of the object, with its subordinate objects that the object includes, displayed via an interaction (for example a clicking on an object with a mouse), meaning that he may navigate to the next lowest level. It is hereby enabled to have the error of an object on a lower level displayed, and thus to be able to further isolate the error.

In an exemplary embodiment, the objects displayed in the individual levels of the presentation are displayed as a graphic, wherein this graphic may schematically reflect the external optical appearance of the respective object. The position at which the object is located and its alignment are likewise reflected in the depiction of the objects, optimally corresponding to reality. Assistance of an operator, and in particular of a service technician, is hereby enabled via this optical information. Since, in the implementation of an error correction or servicing, the service employee receives a display of the position and alignment of the respective module to be exchanged or serviced, he may conduct his activity efficiently, simply and with the avoidance of personal mistakes. Instructions may additionally be shown to the service technician on the display in order to assist him in his work. Furthermore, by changing the view of the displayed modules (for example from the front view to the back view or side view) it is possible to provide the service technician with additional assistance in his activity, in particular if modules have connections, displays, switches etc. on the front side and back side.

The depiction of the server cabinet or rack, the rack modules, the components and the modules is explained in detail further below.

In a further embodiment of the monitoring method, a setting of the production system is determined from at least one detected error, given which setting the influence of the error on the production process is minimized or nullified entirely.

In an exemplary embodiment, one or more possibly modified settings may hereby be determined. If the present setting of the production system is determined as a single possible setting, there then exists no other modified setting in order to further minimize or entirely nullify the influence of the error on the production process. Inasmuch, the setting of the production system as it is presently made up remains, and the influence of the error continues to exist. However, by determining one or more modified settings the possibility is achieved of maintaining the production process until an exchange of the faulty module, at least such that the productivity and/or production quality of the production system is only minimally limited or is not limited at all.

The at least one determined, modified setting is displayed at the control panel so that an operator or service technician is thereby supported in implementing this manually. Additional instructions can hereby additional relevantly display the reconfiguration. The operator or service technician configures the production system such that be applies the displayed setting to the production system.

In an exemplary embodiment, a reconfiguration is an application of a different setting to the production system or a changing of its current configuration. A reconfiguration pertains to the configuration settings of software and/or hardware such as components or application software, wherein parameters of the production system may be modified.

In particular, given a printing system the determination of a modified setting also pertains to printing parameters and the adjustment of software components, and the adjustment of these printing parameters. For example, given an error a maximum possible print speed or print resolution may be indicated.

If, via the monitoring method, at least one setting (including a modified setting) of the production system is determined from a detected error, in which setting the influence of the error on the production process is minimized or entirely nullified, this setting can be implemented automatically. Components, application software and/or the production system are hereby correspondingly reconfigured.

In an exemplary embodiment, the reconfiguration of the modified setting is executed automatically to ensure the efficiency or function of the production system immediately or at once, even without a promptly available service technician. Via an immediate reconfiguration upon occurrence of an error, a production waste may additionally be avoided or minimized, for example in that the production speed is decreased.

In particular given a high-capacity printing system, a spoilage may result given an error, which spoilage comprises 50 m of recording medium, for example. This spoilage may be minimized or avoided via automatic reconfiguration, such that significantly less recording medium is lost.

In a further embodiment of the monitoring method, the detected errors are stored with associated information in an error list.

In an exemplary embodiment, the information associated with the errors thereby includes information such as timestamp, error location, component, module, error type, error priority, error frequency, error certainty, and additional information describing the errors.

In an exemplary embodiment, upon reaching a predetermined error count, at predetermined time intervals or as needed, the error list can be transmitted to an external evaluation organization. The additional evaluation of the errors thereby includes the evaluation of the quality of components and/or modules.

A transmission as needed includes a transmission upon request. The term "external" means outside of the production system.

Via a transmission of the error lists it is enabled that it is possible to evaluate error lists of a plurality of different production systems jointly, and thus efficiently. From this the advantage additionally results that more precise conclusions about the quality and compatibility of individual hardware and software parts of the production system may be made with the aid of such a broader database. These conclusions may be used as a decision aid for new configurations of a production system that are to be established, and of its settings.

In a further embodiment of the monitoring method, an error certainty for a detected error is determined, wherein the error certainty indicates how high the probability is that an error has actually occurred or not.

In an exemplary embodiment, the error certainty may be transmitted in the error report to an external service organization, be stored in the error list and/or be transmitted to an external evaluation organization and/or be taken into account for a reconfiguration of the production system. The error report, the error list and the reconfiguration have already been explained above.

In an exemplary embodiment, the error priority linked with the error certainty enables a more precise estimation of whether and when a service, maintenance or a reconfiguration needs to take place. If the error certainty is high, the error priority for the assessment of the cited measures that are to be implemented is significant. However, if the error certainty is low, it is more likely probable that none of the cited measures is to be implemented. For example, an external service organization or its system for service coordination may thus optimally plan timing of the service operations on the basis of this information.

In one or more exemplary embodiments, the error certainty for a detected error may be determined under consideration of one of the following strategies, or multiple of the following strategies in combination with one another:

check the reliability of the parameter value triggering the error via comparison with parameter values of other monitoring program modules, wherein the parameter values of other monitoring program modules are either associated with the same parameters or have a logical relationship with the parameter value triggering the error, wherein the comparison includes a weighted assessment of the different parameter values, check the reliability of the parameter value triggering the error under consideration of measurement errors and/or measurement tolerances, and/or determine the error frequency and/or the constancy of the error.

Parameter values having a logical relationship with one another are those given which the parameter values are linked with one another since the originate from status data that have the same base data or base data having a logical relationship with one another. Such a logical relationship is, for example, present given sensors that detect the same physical value at various positions of the production system as a status datum.

In an exemplary embodiment, by mapping one such parameter value exhibiting a deviation to another parameter value that is logically linked with this, the plausibility (and therefore the probability) of the deviation may thus be assessed.

The parameter values used for such an evaluation can additionally be assessed with a weighting, wherein in the simplest case the weighting is equally distributed.

However, the status data of specific monitoring program modules may also be ascribed a higher weighting than those of other monitoring program modules. It is thereby possible to allow status data of monitoring program modules that determine more precise status data a greater proportion of influence in an evaluation of an error certainty than status data of other monitoring program modules that are more imprecise. In particular, the effects of measurement tolerances between different monitoring program modules may thereby be minimized.

Such a weighting also enables one monitoring program module to be established as master and one or more others as slaves, wherein the error certainty is in principle determined from the parameter values of all monitoring program modules. However, in the event that the values between the master and the one or more slaves differ such that no unambiguous error certainty may be determined, the parameter values of the master are used alone to determine the error certainty.

Given the presence of multiple (at least three) parameter values of different monitoring program modules, which parameter values are logically linked with one another, an additional possibility to determine an error certainty by means of weighting is to take into account the plurality or the majority of the statements of the deviations of the individual parameter values for the error certainty.

Measurement tolerances of a monitoring program module may also additionally be taken into account for the calculation of the error certainty, in that the deviation of a transmitted status value is compared with the predicted deviation caused by the measurement tolerance.

An additional possibility for determining an error certainty is to also take into account the frequency of the occurrence of an error and/or the constancy or permanence of the error. If an error is detected more often or continuously, its error certainty is greater than if it is detected more rarely.

An additional aspect of the disclosure concerns a system for depicting control devices in a production system (in particular in a printing system), wherein the production system has a rack to accommodate multiple rack modules. The rack modules may thereby be connected with components of the production system and/or have an error indicator device to indicate errors in the rack module and/or to indicate errors at the respective component. A rack presenter is thereby provided to display a rack presentation with which rack module presentations (which respectively show a map of one of the rack modules) can be arranged at the location in the rack presentation that corresponds to the real location of the corresponding rack module in the rack. The rack presenter is thereby connected with the error list in which errors from the production system are stored, and the rack presenter is designed such that the errors can be displayed at the corresponding rack module presentations in the rack presentation.

Via the provision of a rack presenter of such a design, the status—in particular whether and which errors have occurred at the production system—may also be checked remotely. In particular, given occurred errors a service technician or operator is informed at the display of the rack presentation about the real location of the corresponding rack module in the rack, such that he is assisted in the error correction and may implement this with a high probability of no errors.

In an exemplary embodiment, a rack is an assembly support or a retention device that typically combines a quantity of smaller elements or modules into a unit, for example a stand or a frame.

In an exemplary embodiment, the system is designed to present control devices in a production system such that one or more of the rack module presentations has an error indicator means that corresponds to an error indicator device of the corresponding rack module. With the error indicator means, given the presence of a corresponding error this can be presented similar to as at the error indicator device.

Upon occurrence of an error that the rack presentation displays, it is thereby accordingly enabled to transfer to a client computer only the information that modifies the presentation of the error indicator means.

The display of an error at a corresponding rack module presentation may take place via a change, for example of a color and/or shape.

In a further embodiment of the system for presentation of control devices in a production system, the rack presenter comprises two different rack module presentations for at least one rack module. One of the two rack module presentations thereby shows the rack module in normal operation, and the other rack module presentation shows the rack module in an error operation.

In this embodiment of the system for presentation of control devices, the rack module presentations are swapped in the event of error. The rack module presentation for the error case is thereby designed so that the error is recognizable. For example, this may be presented in that a specific error light (which glows red in the event of error, for example) is correspondingly shown red in the rack module presentation. On the other hand, an error may herewith also be presented that is not visible at the real rack. For example, if the real rack module is defective and has no error indicator device, the rack module may then be provided with a corresponding warning color (in particular a red color) in the event of error. Errors can hereby also be depicted that are not visible at the real rack.

In a further embodiment of the system for presentation of control devices, the rack presenter comprises both a rack presentation for the front side of the rack and a rack presentation for the back side of the rack. The rack presenter is thereby designed such that, given the arrangement of a specific rack module presentation at a specific location in the rack, the appropriate corresponding presentation at the front side or back side is automatically associated with the corresponding rack presentation.

Via the system according to the disclosure, at the control panel rack presentations may be displayed that have rack module arrangements whose location in the rack module presentation corresponds to the location in the real rack. Errors may additionally be indicated at the individual rack module presentations. Using the rack presentation, an operator of the production system may hereby immediately recognize at which rack module the error is present, likewise whether the rack module itself or a component of the production system that is connected with the respective rack module is defective. Such racks may comprise a plurality of rack modules, wherein often a plurality of the same or very similar rack modules are also arranged in a rack. The locating of the error-afflicted rack modules is significantly simpler with the rack presenter according to the disclosure than has previously been possible.

In a further embodiment of the system for presentation of control devices, the production system has a control device that comprises a main computer. The main computer is connected via a data connection with one or more client computers. A browser is executed at the client computer. A control panel module library is thereby installed at the main computer and is executed there, with which control panel module library a control panel for the production system is generated and provided that is transmitted as a markup language file from the main computer to the respective browser and is executed in the browser to present the control panel. The rack presentation is thereby displayed at the control panel.

The rack presentation can hereby also be displayed at one of the client computers that is arranged remote from the rack presenter. Via the use of a markup language file that is created according to a standard for markup languages, the possibility results to use as a browser a browser designed according to a browser standard. The display of a rack presentation and the display of the control panel are thereby independent of additionally used software or hardware of the client computer.

In an exemplary embodiment, the control panels displaying the rack presentation may be displayed simultaneously at multiple client computers.

Multiple people (such as operators and/or service technicians) may hereby simultaneously execute the servicing or error correction at the production system. Different rack presentations may hereby also be displayed at the respective control panels at different client computers, such that different maintenance or service tasks may be implemented at each control panel.

In a further embodiment of the system for presenting control devices, the client computers are designed as mobile devices. The data connection to the main computer is thereby formed by a radio connection according to a radio system standard.

In one or more exemplary embodiments, a mobile device is a mobile computer such as, for example, a tablet computer, a laptop, a notebook or a mobile telephone. The radio system standard of the radio connection includes WLAN, Bluetooth, GSM. UMTS and further suitable radio systems. Via the provision of the client computers as mobile devices, it is possible for an operator or service technician who executes a service or maintenance to take the mobile client computer along to the respective rack for which an error is indicated on the control panel in the rack presentation. A faster and more efficient error search and correction is possible via the optical indication of an error while the operator or service technician is located directly at the rack.

In a further embodiment of the system to present control devices, the mobile client computers have an environment sensor. The environment sensor detects the position and/or the alignment of the respective client computer. This information is transmitted from the environment sensor to the rack presenter. The rack presenter is thereby designed such that it controls the generation of the markup language file (which is transmitted to the respective browser) such that the position information and/or the alignment information of the corresponding client computer is taken into account in the rack presentation at the control panel at the corresponding client computer, such that one of multiple rack presentations is automatically selected corresponding to the relative position and/or alignment of the corresponding client computer relative to the production system, and said rack presentation is shown on the control panel.

Given the use of a mobile client computer, the possibility is thereby achieved that one of multiple rack presentations is automatically selected for display at the control panel depending on position and/or alignment of the client in relation to the production system. The automatic selection may thereby take place such that the nearest rack relative to the position of the client computer is displayed in the rack presentation. This enables the display of the rack presentation to be controlled automatically using the distance from the respective rack, in particular given a production system that has multiple racks. If an operator and/or service technician moves from one rack to another, the rack presentation is then switched automatically to the display of the other rack when it is closer to this other rack.

Via the consideration of the alignment of the client computer, it is enabled to control the display of the rack presentation automatically such that—given a production system that has multiple racks—it is enabled that an operator or service technician who holds the mobile client computer in his hand and views the display of the control panel in his line of sight automatically has displayed the rack presentation of the respective rack that is likewise located within his line of sight. If the operator or service technician now turns in another direction—meaning that he changes his line of sight, and therefore likewise the alignment of the client computer—a rack coming into his line of sight may then be displayed automatically in the rack presentation.

Via the detection of a position and/or an alignment, the possibility is likewise achieved to switch automatically between the display of a front side or back side of a rack in the rack presentation. If the operator or service technician is located in front of a rack or in a line of sight with this, the front side of the rack is then displayed in the rack presentation. However, if he is located at the back side or in a line of sight with the back side of a rack, the back side of the rack is then displayed in the rack presentation. The switching between front side and back side in the rack presentation takes place automatically when the user or service technician moves, and in fact according to the position and/or alignment of the client computer.

The environment sensor that detects the position and/or the alignment of the respective client computer is designed as: a (stereo) camera; navigation sensor; radio receiver, in particular to receive radio signals that are in particular sent according to the Bluetooth radio standard; lidar sensor; ultrasound sensor; acceleration or movement sensor; magnetic field sensor; infrared sensor; or as a combination of multiple of these sensors.

In an exemplary embodiment, the production system as explained above is set up in an internal room. Typical navigation sensors for satellite navigation systems cannot be used in order to be able to establish a position here. However, radio systems are known—in particular according to the Bluetooth radio standard—that enable a determination of the position and/or alignment of the client computer, even in internal rooms. However, the determination of a position and/or alignment can also be implemented with the other cited sensors.

The precision of the determination of the position and/or alignment can be improved via combination of multiple of these sensors.

In an exemplary embodiment, the production system is a liquid toner printing apparatus.

In one or more exemplary embodiments, liquid toner printing apparatuses are printing apparatuses in which toner particles are applied onto a recording medium to be printed with the aid of a liquid developer. For this, a latent charge image of a charge image carrier is inked by means of electrophoresis with the aid of a liquid developer. The toner image that is created in such a manner is transferred to the recording medium indirectly via a transfer element or directly. The liquid developer has toner particles and carrier fluid in a desired ratio. In an exemplary embodiment, mineral oil is used as a carrier fluid. In order to provide the toner particles with an electrostatic charge, charge control substances are added to the liquid developer. Further additives are additionally added, for example in order to achieve the desired viscosity or a desired drying behavior of the liquid developer.

Example digital printers are described in DE 10 2010 015 985 A1, DE 10 2008 048 256 A1, DE 10 2009 060 334 A1 or DE 10 2012 111 791 A1.

In an exemplary embodiment, the production system may be designed to execute one or more of the aspects explained above.

In exemplary embodiments, methods according to the individual aspects explained above may be executed independently of one another. However, it is also possible to execute these methods in arbitrary combinations.

Figure 2:
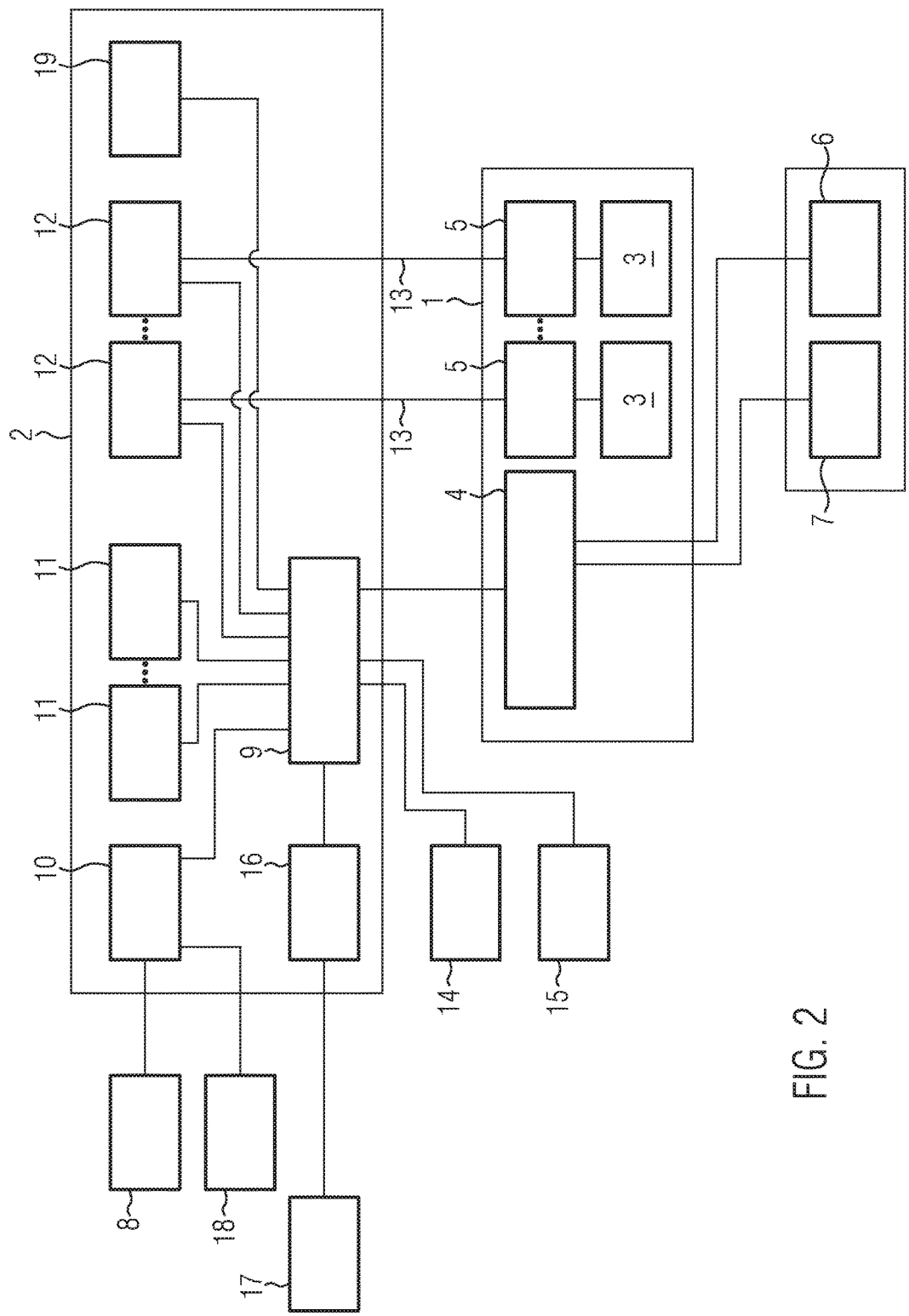

An exemplary embodiment of a digital printing system comprises a printing apparatus 1 and a controller 2 (FIG. 2).

According to FIG. 1, a digital printer as a printing apparatus 1 for printing to a recording medium 120 can include one or more print groups 111a-111d and 112a-112d that print a toner image (print image) onto the recording medium 120. As shown, as a recording medium 120 a web-shaped recording medium 120 is unspooled from a roll 121 with the aid of a take-off 6 and supplied to the first print group 111a. The print image is fixed on the recording medium 120 in a fixer 130. The recording medium 120 may subsequently be taken up on a roll 128 with the aid of a take-up 7. Such a configuration is also designated as a roll-to-roll printer.

In the exemplary embodiment shown in FIG. 1, the web-shaped recording medium 120 is printed to in full color on the front side with four print groups 111a through 111d, and on the back side with four print groups 112a through 112d (what is known as a 4/4 configuration). For this, the recording medium 120 is unwound from the roll 121 by the take-off 6 and supplied to the first print group 111a via an optional conditioning group 123. In the conditioning group 123, the recording medium 120 may be pre-treated or coated with a suitable substance. Wax, or chemically equivalent substances, may preferably be used as a coating substance (also designated as a primer).

This substance may be applied over the entire surface, or only to the points of the recording medium 120 that are to be printed to later, in order to prepare the recording medium 120 for printing and/or to affect the absorption behavior of the recording medium 120 upon application of the print image. With this it is prevented that the toner particles or carrier fluid that are applied layer do not penetrate too deeply into the recording medium 120, but rather remain essentially on the surface (color quality and image quality are thereby improved).

The recording medium 120 is subsequently supplied first, in order, to the first print groups 111a through 11d, in which only the front side is printed to. Each print group 111a-111d typically prints to the recording medium 120 in a different color, or also with a different toner material (for example MICR toner which can be read electromagnetically).

After printing to the front side, the recording medium 120 may be turned in a turner 124 and be supplied to the remaining print groups 112a-112d for printing to the back side. In the region of the turner 124, an additional conditioning group (not shown) may optionally be arranged via which the recording medium 120 is prepared for the printing to the back side, for example a fixing (partial fixing) or other conditioning of the previously printed front side print image (or of the entire front side, or also back side). It is thus prevented that the front side print image is mechanically damaged upon further transport through the subsequent print groups.

In order to achieve a full color printing, at least four colors (and therefore at least four print groups 111, 112) are required, and in fact the primary colors YMCK (Yellow, Magenta, Cyan and Black). Additional print groups 111, 112 with special colors (for example customer-specific colors or additional primary colors in order to expand the printable color space) may also be used.

Arranged after the print group 112d is a register 125 via which registration marks—which are printed on the recording medium 120 independently of the print image (in particular outside of the print image)—are evaluated. The transversal and longitudinal registration (the primary color dots that form a color point should be arranged atop one another or spatially very close to one another: this is also designated as color registration or four-color registration) and the register (front side and back side must spatially coincide precisely) can therefore be adjusted so that a qualitatively good print image 20' is achieved.

Arranged after the register 125 is the fixer 130 via which the print image is fixed on the recording medium 120. Given electrophoretic thermal driers, a thermal dryer that largely evaporates the carrier fluid is preferably used as a fixer 130 so that only the toner particles still remain on the recording medium 120. This occurs under the effect of heat. The toner particles may thereby also be fused to the recording medium 120 insofar as they have a material (such as resin) that can be melted as a result of the effect of heat.

Arranged after the fixer 130 is a puller 126 that pulls the recording medium 20 through all print groups 111a-112d and the fixer 130 without an additional drive being arranged in this region. The danger that the as of yet unfixed print image could be smeared would exist due to a friction drive for the recording medium 120.

The puller 126 feeds the recording medium 120 to the take-up 7, which rolls up the printed recording medium 120.

Centrally arranged in the print groups 111, 112 and the fixer 130 are all supply devices for the digital printer 1, such as climate control modules 140, power supply 150, controller 2, fluid management modules 170 (such as fluid controller 171 and reservoirs 172 of the different fluids). In particular, pure carrier fluid, highly-concentrated liquid developer (high proportion of toner particles in relation to carrier fluid) and serum (liquid developer plus charge control substances) are required as fluids in order to supply the digital printer 1, as well as waste containers for fluids to be disposed of or containers for cleaning fluid.

The digital printer 1, with its structurally identical print groups 111, 112, is of modular design. The print groups 111, 112 do not differ mechanically, but only due to the liquid developer (toner color or toner type) that are used therein.

Such a print group 111, 112 is based on the electrophotographic principle in which a photoelectric image carrier is inked with charged toner particles with the aid of a liquid developer, and the image that is created in such a manner is transferred to the recording medium 20.

The print group 111, 112 is essentially comprised of an electrophotography station, a developer station and a transfer station.

Such high-capacity digital printers extend over a length of 10 m to 30 m, depending on model and configuration. Therefore, multiple control panels are appropriately to be provided that allow data of the digital printer to be read simultaneously by multiple persons, and allow control panels to be viewed at multiple locations.

Turning to FIG. 2, the printing apparatus 1 has internal controllers that comprise a printing apparatus controller 4 and multiple print group controllers 5 (BDB: bar driving board) (FIG. 2). The print group controllers 5 transmit the rastered print data to the corresponding print groups. These rastered print data are for the most part binary print data, wherein every bit represents a print dot. If the bit is set, the corresponding print dot is printed. If the bit is not set, the corresponding print dot is then not printed.

The printing apparatus controller 4 controls the main module of the printing apparatus 1, the paper transport, and executes general control tasks with regard to the print groups 3. The print apparatus controller 4 has interfaces regarding pre- and post-processing apparatuses that in particular comprise the take-off 6 and the take-up 7. Additional pre- and post-processing apparatuses—for example a cutting apparatus, envelope apparatus or the like—may be connected.

The controller 2 serves to process print jobs which are transmitted to the controller 2 from a print server 8. Such a print job normally includes the print data and a job ticket. The job ticket includes instructions of how the print data are to be processed. The controller 2 has multiple computers that are connected with one another via an internal LAN 9. For example, the LAN may be designed as Ethernet or Infiniband. The computers comprise a main computer 10, multiple raster computers 11 and multiple interface computers 12.

The main computer 10 receives the print jobs and distributes portions of the print jobs to the raster computers 11 for rastering of print data. The main computer 10 hereby attempts to utilize the raster computers 11 as uniformly as possible. The raster computers 11 convert the print data into rastered print data suitable for controlling the print groups 3. The rastered print data are relayed from the raster computers 11 to the interface computer 12 via the internal LAN 9. The rastered print data are cached at the interface computers 12. Every interface computer 12 is respectively connected via an optical waveguide 13 with one of the print group controllers 5 and transfers the rastered print data to the corresponding print group controller 5 via said optical waveguide 13.

The printing apparatus controller 4 is connected to an external interface of the internal LAN 9 of the controller 2 and receives from the main computer 10 of the controller 2 control commands to control the printing apparatus and the pre- and post-processing apparatuses.

The internal LAN 9 of the controller 2 may have additional internal interfaces to connect one or more control panel computers 14 and/or one or more service computers 15.

Furthermore, the controller 2 has a router 16 to which a service computer 17 may be connected via a WAN.

A printer control panel computer 18 is directly connected via an SPO-LAN (Service Panel Operator-LAN) with the main computer 10 of the controller 2. The printer control panel computer 18 serves to monitor and control the print data. This printer control panel computer 18 is typically used by an operator who controls the workflow of the different printing processes at the printing system. In contrast to this, the control panel computers 14 or service computers 15 are used by operators or service technicians who are themselves responsible for the continuous operation of the printing system.

The printing system may have multiple control panel computers 14 and/or multiple service computers 15, and may also be connected with multiple printer control panel computers 18.

The service computers 15, 17 differ from the control panel computers 14 in their access rights, wherein the service computers 15, 17 may make more adjustments to the printing system than the control panel computer 14, as is explained further below. An installation of software components may also be made to service computers (for example to the printing system), which is not possible given control panel computers 14.

The controller 2 has a remote servicing module (PCI: Power Control Interface) 19. With this remote servicing module 19, the controller 2 may be started up or shut down via remote control. Moreover, this remote servicing module 19 supplies additional functions for remote control of the controller 2.

Given this printing system, multiple control panels are provided at the computers 14, 15, 17, 18.

Figure 3:
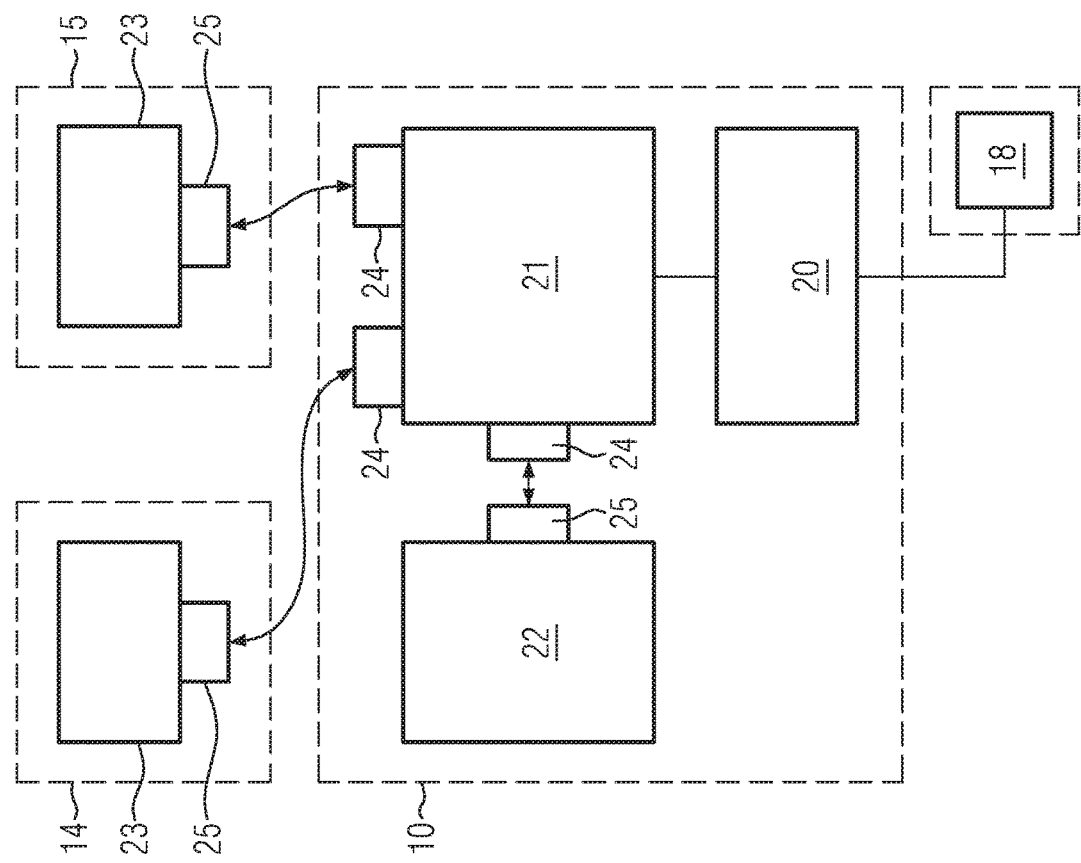

With reference to FIG. 3, at the main computer 10 of the controller 2, a control panel module library 20 is provided which comprises multiple control panel modules with which a control panel for the printing apparatus may be presented on the computer display (FIG. 3). The control panel modules also allow a control of the printing apparatus 1 via the control panel presented on the computer display.

The printer control panel computer 18 is connected with the control panel module library 20 via the SPO-LAN. Provided at the printer control panel computer 18 is a client program with which the control panel is presented and the corresponding control functions are executed.

The control panel module library 20 is connected with a web user interface 21 that is a web server with which the control panel modules of the control panel module library 20 are made available in a browser. In the present exemplary embodiment, the web user interface 21 has been realized via an Apache Tomcat server. In principle, other web servers are also suitable here.

This web user interface 21 may communicate directly with a browser 22 provided on the same computer, wherein the communication is implemented via web sockets 24, 25. For communication with "external" browsers 23 which are provided on additional computers 14, 15, the web user interface 21 is coupled with an additional respective web socket 24. The web socket 24, 25 is a software module that forms an interface which may establish a continuous logical Internet connection with a browser that is connected via a data connection with the computer at which the web socket 24, 25 is arranged. The data connection is hereby a data network, for example.

The browser 22 on the main computer 10 and the browsers 23 on the computers 14, 15 may thus be continuously supplied with information from the web user interface 21 or may transmit information and in particular messages to the web user interface 21 at any time. For this, the browsers 22, 23 respectively have a corresponding web socket 25.

The individual software modules that are provided on the different computers are explained in detail in the following.

With reference to FIG. 4, in addition to the already explained control panel module library 20, the web user interface 21 and the browser 22, an operating system 26, a function code 27, an infrastructure manager 28 for interfaces to the hardware, a web user interface database 29, web user interface plugins 30 and a trace module 31 are provided at the main computer 10 (FIG. 4).

The trace module 31 serves to record error protocols of all software components executed in the printing apparatus 1 and/or in the controller 2 and/or of "external" software components that are executed on other computers 8, 14, 15, 16, 17, 18.

The function code 27 is designed for the execution primarily of printing-relevant software routines, for example a load distribution of the print data from the main computer 10 to the raster computers 11, raster calculations at the raster computers 11 for a rastering of the print data, and controlling a caching of the rastered print data at the interface computers 12. With the function code 27, the arriving print jobs are processed so that they may be printed out at the printing apparatus 1.

The web user interface database 29 includes all persistent data for the operation of the web user interface 21, for example long-term data, data for user configuration, settings, initialization data (for sensors, for example), data for monitoring structures (which are explained further below), as well as additional data that are necessary for the operation of the web user interface 21.

The web user interface plugins 30 serve for communication with the local computer or additional external computers at which corresponding web user interface plugs are provided. Predefined tasks or applications are stored in a web user interface plugin 30.

With reference to FIG. 5, the control panel module library 20 includes a plurality of control panel modules that are explained in detail in the following:

A DE agent (device agent) 32 creates a data connection for the communication between the control panel and the printing system, and represents the link between the control panel and the printing system. Furthermore, the DE agent 32 provides a standardized interface in order to make the printer status available.

An RMI server (Remote Method Invocation server) 33 has functions that may be called by an external computer and that are executed on the computer at which the RMI server is executed, for example for the further processing of events. Furthermore, it provides functions that facilitate or enable such a remote access. For example, such functions are the assignment of access tickets, as is explained in detail below.

An ORS agent (OCÉ Remote Service agent) 34 collects hardware data and data of software events and transfers these data from the main computer 10 to a computer (not shown) of a service center via a WAN (Wide Area Network).

A trace agent 35 enables the recording or logging of trace data of other modules and the preparation of these data.

A web server 36 enables the downloading of program libraries (for example of Java program libraries) from the main computer 10 to the computer 14 in order to be able to present and control the control panel at this computer 14. Furthermore, the web server 36 provides a web start function (for example a Java web start function) in order to initialize the control panel at the computer 14. In the present exemplary embodiment, the web server 36 is realized by an Apache Tomcat server. In principle, any other web server, any other program library and/or any other web start function is suitable for this.

A system parameter manager 37 (SPManager) serves for data distribution between the modules.

An SEA agent (service event log agent) 38 implements a protocol or a log file of the events that have occurred.

An OP master 39 provides a network interface, for example an SNMP gateway for the transfer of parameters to and from the printing apparatus 1.

A UIC agent (User Interface Controller agent) 40 enables the control of predetermined workflows or the adjustment of defined states of printing systems connected with the main computer 10. For example, the startup of the printing apparatus 1 may be executed automatically with this.

A TR file collector 41 is an agent that—as a supplement to the trace agent 35—collects and prepares trace data from programs executed on the main computer, which programs have been provided by third-party vendors.

An Ops-PAC (Ops Privileged Access Service) 42 serves to assign privileged rights (administrator rights) to other agents or applications for the implementation of specific functions. These privileged rights are predominantly necessary in order to execute the agents or applications with the desired effect.

An RDP agent (Remote Diagnosis Process agent) 43 provides an internal service interface.

An error agent 44 serves to remedy, collect, distribute, present and reset errors.

A CDC agent 45 serves for the normalized relaying of printing parameters to other agents or modules at other controllers 2 of other printing apparatuses 1. These printing parameters are, for example, paper width, color etc.

With reference to FIG. 6, the web user interface 21 comprises a plurality of web user interface modules that are explained in detail in the following:

A web server module 46 (for example an Apache Tomcat) provides the web server functions (already explained above) of the web user interface 21. The web server module 46 and the web server 36 explained above may also be combined into one web server that is executable or executed on the main computer 10.

In the web server 46 is a framework 47 that provides rules, methods, functions, classes and/or structures for the control of the web server module 46, in particular with regard to data objects with which a control panel is described. In the present exemplary embodiment, the framework 47 is a Grails framework. In principle, other frameworks are also suitable here.

The programming of the control of the web server module 46 or of the web user interface 21 takes place with the aid of a program code 48. Program routines that are part of the program code 48 are further transmitted as needed to the browsers 22, 23 for execution, wherein the browsers 22, 23 are controlled (preferably in a control panel file, as is explained further below) via these transmitted program routines. The program code 48 is created in one or more (scripting) programming languages. In the present exemplary embodiment, the (scripting) programming languages that are used are Java and Groovy. In principle, other programming languages or scripting programming languages are suitable here. The program code 48 includes printer-specific programs, program routines, methods, functions, classes, structures and/or extensions.

External plugins 49 and external libraries 50 are used in order to provide additional functions for the programming and/or control of the web user interface 21.

Web server services 51 are made available by the web user interface 21 to external communication partners, wherein external communication partners are apparatuses, installations, devices or software modules that are located outside of the web user interface and communicate with said web user interface 21. The web server services 51 are initiated by the external communication partners and execute functions within the web user interface 21.

Data are processed with the aid of views 52 for presentation at the user interface of the control panel.

Control structures 53 (controllers) take over control functions within the web user interface 21, prepare the data to be presented in terms of their content, provide functions and data, wherein in particular data to be displayed at the request of the browsers 22, 23 are provided to the views 52.

With reference to FIG. 7, the web server services 51 include a plurality of service components that are explained in the following.

An IsMa service (infrastructure manager service) 54 serves to be able to call plugins and communicate with other IsMa services 28 at "external" systems, for example at other computers 11, 12.

Menu structures are generated and administered via a menu service 55. Menus may be dynamically reloaded at "external" systems, for example.

A push helper service 56 enables a load distribution and monitored, chronologically staggered transfer of data to "external" systems.

An RMI service 57 enables the communication between the web user interface 21 and the RMI server 33 of the control panel module library 20.

A scheduler service 58 reacts to software events and fulfills chronologically pre-planned tasks, for example a purging of a database.

With reference to FIG. 8, the browsers 22, 23 include various browser components that are explained in the following.

A (scripting) programming language module 59 serves to control the browsers 22, 23 and to control their communication with the web user interface 21. The (scripting) programming language module 59 is an interpreter or a compiler for a scripting programming language or a programming language. In the present exemplary embodiment, JavaScript is used as a scripting programming language. In principle, other (scripting) programming languages are also suitable here.

A markup language module 60 enables the interpretation and presentation of the markup language files transmitted to the browsers 22, 23, wherein the markup language serves for the structuring of digital contents (such as texts, images and hyperlinks) in electronic documents, as has already been explained above. In the present exemplary embodiment, the markup language is realized according to the "HTML5" (Hypertext Markup Language) standard, which is presently developed by the World Wide Web Consortium. In principle, other markup languages are also suitable here.

A document access interface 61 is an interface that enables access to structured electronic documents such as the markup language files transmitted to the browsers 22, 23. Their data structure may hereby be presented in the form of a tree structure. In the present exemplary embodiment, a document access interface according to the "DOM Level 3" (Document Object Model) standard is used, which standard has been defined by the World Wide Web Consortium. In principle, other document access interfaces are also suitable here.

A design language module 62 provides a text-based design language for the formatting or declarative programming language for style templates of the structured electronic documents. The presentation of the markup language files transmitted to the browsers 22, 23 is formatted with the aid of the design language module 62. In the present exemplary embodiment, the design language is realized according to the "CSS3" (Cascading Style Sheets) standard, which has been defined by the World Wide Web Consortium. In principle, other design languages are also suitable for here.

With reference to FIG. 9, a raster computer 11 comprises various software components. In the present exemplary embodiment, these software components are an operating system 26, the function code 27, the infrastructure manager 28 and web user interface plugins 30, which have already been explained above.

With reference to FIG. 10, an interface computer 12 comprises various software components. In the present exemplary embodiment, these software components are an operating system 26, the function code 27, the infrastructure manager 28 and web user interface plugins 30, which have already been explained above. In addition to these software components, another print group control driver 63 is present that enables the interface computer 12 to transmit print data to the print group controller 5.

With reference to FIG. 11, the printing apparatus controller 4 includes various software components that are explained in the following.

A main module 64 serves to control and monitor additional software components of the printing apparatus controller 4.

A paper transport module 65 controls the paper transport of the printing apparatus 1 in that it controls the take-off 6, the take-up 7 and additional drive rollers (not shown) in the printing apparatus 1.

Via sensors (not shown), a printing unit module 66 detects various parameters of the print group 4 (for example temperature, humidity, presence of paper etc.) that directly or indirectly affect the printing capability and/or the print quality. From the detected sensor data, the printing unit module 66 determines a printer status in that it evaluates the detected parameters. This evaluation occurs via a check as to whether the respective parameter values are within predetermined value ranges that define a regular operation of the print group 4. The printer status is transmitted to the main computer 10.

With reference to FIG. 12, as software components, the remote servicing module 19 includes an operating system 26 and an SNMP (Simple Network Management Protocol) service 67. The SNMP service 67 serves for simple network communication of the remote servicing module 19 with other devices of the controller 2.

With reference to FIG. 13, as software modules, the control panel computer 14 includes an operating system 26, a browser 23 and a control panel user interface 68. The control panel user interface 68 enables control panels for the operation of the printing apparatus 1 and/or of the controller 2 to be displayed at the control panel computer 14, and enables adjustments to be made in these control panels. The control panel user interface 68 is initialized, presented and controlled with the aid of the Java program libraries and the Java Web Start function (downloaded from the web server 36 onto the control panel computer 14), as has already been explained above.

With reference to FIG. 14, the service computer 15, 17 includes as software components an operating system 26, a browser 23 and a service module (CoDi: Configuration and Diagnostics) 69 (FIG. 14). With the aid of the service module 69, the configuration of the printing apparatus 1 and/or of the controller 2 may be changed and information regarding the software diagnosis and/or hardware diagnosis may be received from the printing apparatus 1 or the controller 2.

In the exemplary embodiment according to the present disclosure, at least some of the web user interface plugins 30 are designed for scanning of components connected with the main computer 10. Components are all parts of the printing system that have a client computer that is directly or indirectly connected with the main computer 10 via data connections, and that thus may be contacted via an IP address. Client computers are all computers and microprocessor systems that are provided in a production system and may communicate directly or indirectly with the main computer 10 via data connections. Examples of components are: the print groups 111, 112, the conditioning group 123, the turner 124, the register 125, the pulling group 126, the fixer 130, the climate controller 140, the fluid controller 171, the printing apparatus controller 4, the print group controller 5, the raster computer 11, the interface computer 12, the remote servicing (control) module 19.

A plugin is a command line program that is called via established parameters and supplies hardware or software information about predefined response values. Such a plugin is typically a compiled program or a script that may be started from a command line in order to call the corresponding parameter.

The plugins have a standardized call/response interface. Different plugins are provided for different types of components and/or modules. The plugins communicate with the interface of the respective components and/or modules and/or application software modules in order to read out status data that include values (logical values and/or numerical values) that describe properties of the components, modules, application software modules or portions thereof. These status data are analyzed by the plugins and possibly processed further so that values that may be associated with specific parameters of the production system may be extracted from the status data. The plugins may read out specific data processing modules of the computer or of the network (for example a RAID controller, a GbE switch, an uninterruptible power supply) or specific production modules (for example a print head, a heating device of the fixing station) or sensors arranged in the production system (for example a temperature sensor). Status data which are relevant to the determination of errors (for example an error counter) or specific sensors that measure a value relevant to the operation of the module or of the production system are hereby primarily detected. Using these values, the plugins may generate error and/or warning signals, wherein the error and/or warning signals may be provided with different priorities.

The plugins 30 scan all components of the production system. Upon scanning the components, basic information are initially determined, for example: IP address; MAC address; ARP lists; presence of remote maintenance functionality of the individual client computers; as well as the used ports of switches of the internal LAN 9 and of the data connections of the printing apparatus 1. In this step, addresses and identification specific to the respective components—for example a predetermined component ID—are determined. A communication between the main computer 10 and the respective components may be established with these addresses and identifications.

The MAC address is a globally unique network address for a component. According to the IPv4 standard, such a MAC address is linked with the respective IP address associated with the component via the ARP lists, which every network participant keeps and updates using ARP requests of other network participants.

The individual client computers may have remote service functionality that is provided via predetermined ports, for example the known "Integrated Lights-Out" product on the market from the company Compaq.

Only specific components are approved for integration into the printing system. Each of these components has a component ID that is typical to this type of component. This component ID may be an identification that is already typically present for a specific component. There are apparatuses available on the market that have an apparatus-specific identification number. This identification number, which is specific to a specific type of apparatus, may be used as a component ID. If the non-first party components do not have an identification that is specific to the type of respective component, the component is then to be provided with such a component ID. Since the components have a client computer, this component ID may be stored in the memory of the client computer.

A second step of the scanning includes the communication of the plugins 30 (which are located on the main computer 10) with the individual components in order to read out additional detail information from the components. For example, this detail information may include configuration information or information describing the state of the component, for example operating time or the number of pages or sheets printed with this component.

The components are initially scanned with standard operating system functions. For example, they may be called with a ping query whose IP address is determined using the information in a stored and updated ARP list. There is additionally the possibility to scan predetermined IP address spaces.

It is also possible to read and analyze the messages transmitted via the data connections. In particular, basic information may hereby be obtained from the components integrated into the network.

Control templates are stored at the main computer 10 for every component approved for integration of a printing system. Using the specific identifications determined via the scanning, the respective templates are associated with the individual components. Such a template includes a monitoring routine (monitoring service) specific to the component and control parameters that are to be maintained in operation. Furthermore, the template may have configuration parameters that define the functionality of the component depending on its position in the complete printing system. The monitoring routines are configured in the web user interface 21, corresponding to the transmitted control parameters, and are executed there. The web user interface 21 thus serves as a control device for monitoring and controlling the individual components. The topology of a created network map—from which it arises how the individual components are connected with one another—is also taken into account in the configuration of the monitoring routines in the web user interface 21. The control device (=web user interface 21 and monitoring routines) is thus automatically configured using the control template and the network map. The creation of the network map is explained in detail further below.

In the event that, in a scan, a component is detected for which no control template is present, this component is then identified as an unknown component. This unknown component may be examined in detail by means of a routine for analysis of such unknown components. If this analysis does not result in a description of the component that can be trusted, the data connection to this unknown component is then interrupted. It is hereby ensured that no arbitrary components may be integrated into the printing system. Exclusively preapproved and certified components are preferably allowed in the printing system.

The plugins represent a kind of abstraction layer between the control device and the hardware and software to be monitored. The control device is designed completely independently of the components and modules that are used. The plugins alone are designed specific to the interfaces of the hardware and the application software. In addition to the static parameters, dynamic parameters—for example data error rates, process temperature, room temperature, humidity, CPU voltage or other values—may also be monitored with the plugins. A statistic regarding specific values may already be created in the plugins. The control device may combine the data provided by the different plugins and evaluate them jointly. Since only the plugins are designed specific to the individual modules, components and application software modules, their characteristics must be taken into account only in the creation of the plugins. Components that are approved for the production system may thus be integrated simply in that a corresponding plugin is created for this type of component and is stored at the main computer 10 for execution, such that it may be called by the web user interface 21.

FIG. 18 shows a table with standardized call parameters with which it may be established which information is transmitted upon calling the corresponding plugin. The individual parameters may be called with a "-" and an individual letter, or with "--" and a corresponding parameter designation (for example version, help, timeout, warning, critical etc.). A threshold for a warning status or a threshold for a critical status is respectively passed with the parameters -w (-- warning) and -c (-- critical). Detailed information (=status data) that is suitable for error analysis may be called with the parameter -v (-- verbose). With the aid of the thresholds it may be determined whether these status data indicate a critical status or even a warning status. The thresholds may also be defined in the form of ranges. A range has a start point and end point on a numerical scale, wherein the start point and end point may also be +/−∞.

FIG. 19 shows a table with additional call parameters which are standardized and are used primarily for authentication of the query to be implemented.

FIG. 20 shows examples of range definitions given a calling of a plugin.

Command lines for the calling of a fictional "check stuff" plugin with the respective call parameters are listed in tabular form in FIG. 21.

The plugins are designed such that they supply at least one line of text as an output. However, multiple lines of text may also be output.

In the following, the output of a plugin for checking a GbE switch of the company HP is specified as an example:
 switch OK-HP ProCurve 1810G-24 GE, P.2.12, eCos-2.0, CFE-2.1, GbESwitchLAN1

An additional example is the output of a plugin to check an HP server housing (enclosure) in which an error has occurred in a specific plug-in board "9" at a server (which is designated as a blade):
 CRITICAL System: Blade Bay 9 error; Device Degraded; MP reports device is degraded. Check MP LOG for more details.

Furthermore, the output of a plugin for checking the Power Control Interfaces (PCI) is shown:
 PCI OK-U24482-C6100-V170000, 15:27:26 up 9 days, 7:46, load average: 0.41, 0.46, 0.41

The output of a plugin may also supply performance data, configuration data (static or dynamic) and the corresponding component code.

The information collected by the plugins 30 is assembled and structured. The structuring of the information also means a formatting so that this information or the data may be output in a formatted form at the control panel or another graphical user interface (GUI). The data are preferably formatted in tables, wherein a description of a specific parameter and the associated value are included in every line. Such data already structured by the plugin may be directly accepted by the controller and be presented at the control panel. In the present exemplary embodiment, they are assembled as a JSON/XML file. The topology of the network map is defined via the assembly and structuring. These structured data are passed to the web user interface 21.

In an exemplary embodiment, the plugins are designed such that static parameters may be queried with them. For example, for this the query parameter "-- static" or "-- json static" is provided, wherein in the latter case the parameter values are output in the JSON (Java Script Object Notation) format. Such static parameter values may be used for a configuration comparison. For this, a reference database that includes the static parameters of all components and/or modules that are approved for integration into the production system. These static parameters represent a kind of fingerprint of the components and/or modules, such that using these static parameters it may be established which component, module, or application software module is provided in the production system. The configuration of the production system may hereby be detected automatically and completely.

Using the static parameters, the control device may use these "fingerprints" to detect configuration conflicts in that differences between the detected static parameters and the static parameters contained in the reference database are assessed as a conflict.

On the other hand, these fingerprints in the form of the static parameters may also be used for automatic configuration of the production system. If a new version of a component is approved for the production system, a configuration template thus must only be created once for this new component or the new module. This configuration template is loaded on the main computer 10. If the new version of the component or of the module is installed in the production system, then using the fingerprint of the static parameters this new version of the component or of the module is detected and configured correctly in the production system by means of the configuration template. Since the configuration takes place automatically, the expenditure for integration of new versions of components and modules is significantly reduced. This is in particular advantageous for the use of standard computers in a production system, which standard computers—as explained above—are subject to regular generation cycles of less than two years.

Since the configuration template and the control template that is explained further above are respectively applied after the detection of a new component and/or of a new module in the production system, the control template and the configuration template of a specific component or of a specific module may also be combined into a single template that is inherently suitable both for configuration of the control device with which the individual components are monitored and for configuration of the production system.

Via the use of the fingerprints explained above, a precise description of the individual components or modules is obtained with which it is possible to execute the automatic configuration by means of the configuration template. These fingerprints therefore preferably include one or more static parameters that inherently describe the component or the module (serial number, component ID, type designation etc.) and one or more static parameters that define the design of the component or of the module in more detail (for example the installed memory range; the number of ports; identifications of the software—in particular firmware and operating system software—installed on the component or the module; and/or a description of the preferred settings, for example site or installation space (location), (in-house) maintainer, maximum number of check attempts, (external) service contact, time period for a new service notification in the event of error (notification period), check interval (retry interval)). The parameters that describe the setting may define both settings at the respective component and/or settings at additional components and/or modules with which the new component to be added and/or the new module to be added interact. Ranges are indicated that are to be complied with in the setting of specific parameters, such that—given the automatic configuration for a specific parameter that is important for multiple components or modules—an intersection may be formed in order to determine one or more values that are suitable for all of these components or modules.

Via the scanning, information about the individual components of the production system exists, as has already been explained above. The topology of the network of the production system can be determined using the MAC addresses determined via a plugin. This determined topology is stored in a suitable data structure that represents the hierarchically arranged network map. The internal LAN 9 or, respectively, one of the switches that make up the internal LAN 9 is thereby preferably at the uppermost point in the network hierarchy. The components connected to the respective switch of the internal LAN 9 are thereby joined hierarchically downstream of the switch. The detail information of the individual components, switches etc. are already known via the scanning, as explained above. In a further step, this detail information is added to the data structure that represents the network map to which are added components referenced via the MAC addresses. The network map is thereby created and may be further used by other components and/or software modules.

The scanning of the components and the creation of the network maps may also be executed repeatedly. A network map is preferably created upon every restart of the printing system. Upon scanning, the individual components and/or modules are preferably detected using the fingerprints explained above. In principle, however, it is possible that the components of merely detected using a single parameter (in particular the component ID) instead of such a fingerprint (which includes at least two and preferably at least three static parameters).

Furthermore, the network map may be recreated after expiration of a specific interval. These intervals may be in the range from a few hours to a few days. A new network map is preferably created every day. The network maps are preferably archived so that the state of the printing system is documented.

Furthermore, it may be appropriate to automatically implement a scanning of the printing system and to create a new network map upon detection of a new component in said printing system.

Figure 15A:
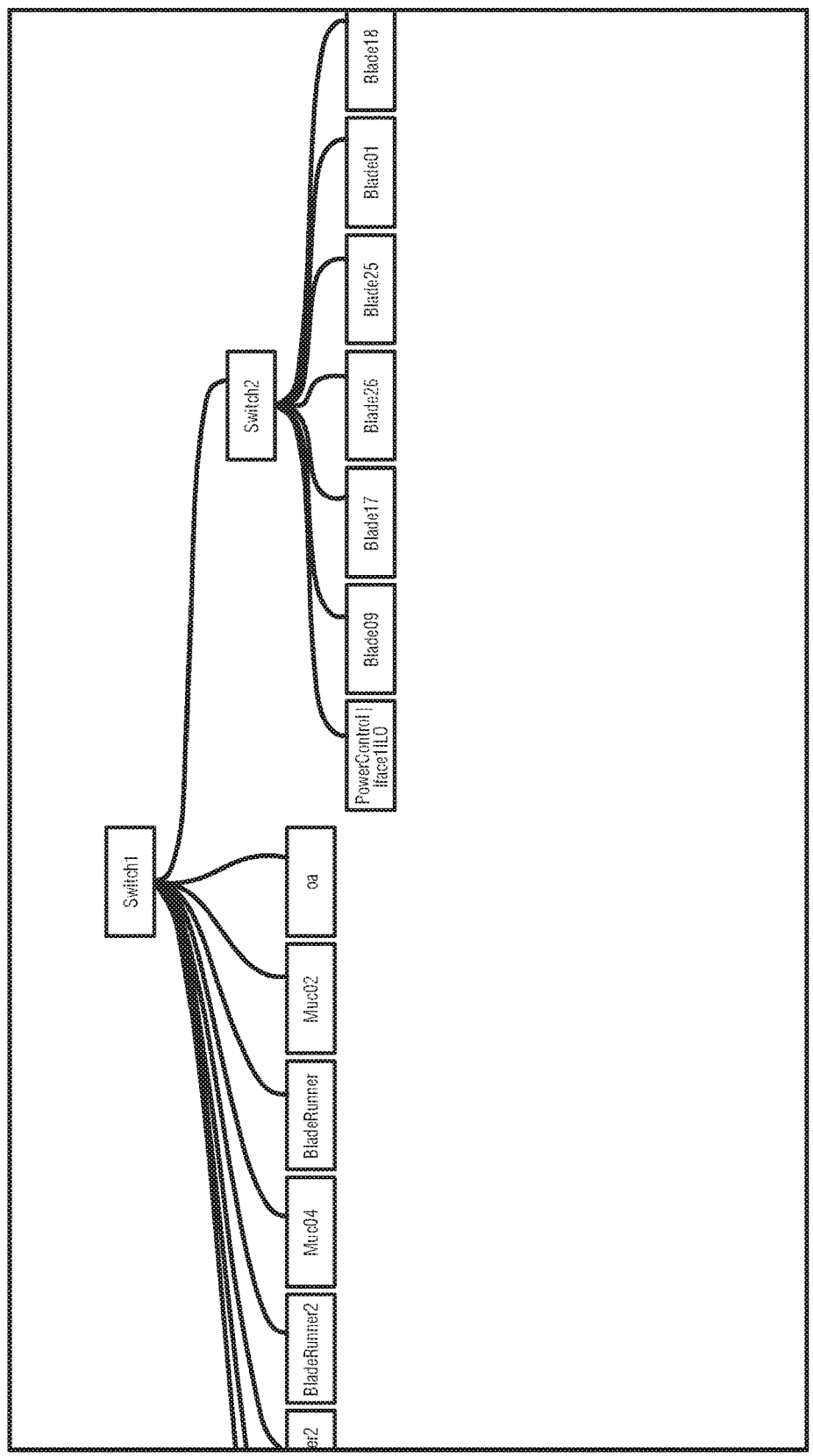
FIGS. 15a and 15b illustrate an automatically detected network map according to an exemplary embodiment of the present disclosure.
Figure 15B:
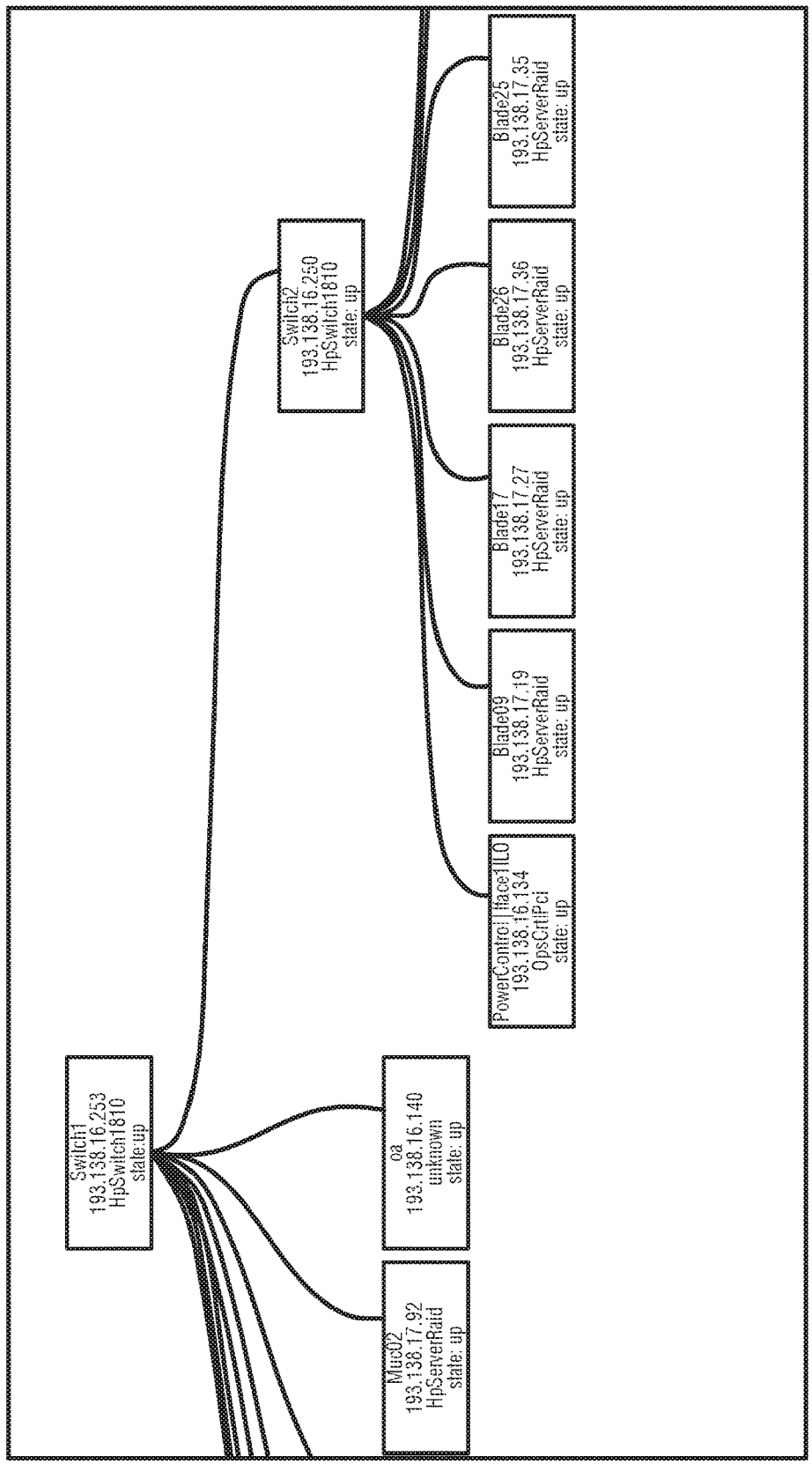

With reference to FIGS. 15a and 15b, a network map created in such a manner may be visualized at the control panel. The network map may hereby be presented with different zoom factors in different sections.

The created network map is also preferably used to configure the control panel. The individual templates may also include parts of the control panel that either refer to predetermined control panel modules of the control panel module library 20 or supplement this.

The individual components (FIG. 16) and details of the components (FIG. 17) may also be presented at the control panel.

Furthermore, the network map may be exported. The export may take place as a data structure or image file. The data to be exported may also be filtered before the export. For example, an export of the network maps may be provided for a service technician, which export lists the operating times and/or the number of produced units (for example printed pages) for the respective components. Error messages may be included in the export file so that a service technician immediately recognizes which component is to be repaired or serviced.

On the other hand, the data may also be prepared for other purposes, such that the data to be exported include data relevant to accounting and/or for service agreements, which data describe the use of the individual components or the consumption of materials. These data may be exported in different formats (for example pdf, SAP, xls). For the plant management or executive management, it may also be reasonable to export the network map together with statistical data that describe the reliability of the individual components.

The automatically detected network maps may thus have versatile uses.

The following advantages are achieved with the method according to one or more exemplary embodiments of the present disclosure:

All essential information of the individual components of the printing system is present.

A network map or network schematic may be visualized at any time so that an operator easily receives an overview of the printing system.

The current state of the printing system may be archived as a reference.

The configuration of the control device is implemented wholly automatically. Errors are hereby avoided. The printing system may be quickly set in operation with an arbitrary configuration.

No complicated programming tasks are necessary upon assembling a new configuration of the printing system.

Changes in the configuration of the printing system may be monitored and quickly detected.

Address conflicts may be detected. For example, such conflicts occur if a service technician and/or a developer connects a computer that is not correctly set up to the printing system. The connection of the computer may be rejected, or a corresponding conflict may be corrected automatically.

The method according to the one or more embodiments can be extended to the installation of a software component in the production system in order to check dependencies of a software component to be installed on other software and hardware components, and to administer the software installed on the production system.

An exemplary embodiment of such an extended method according to the disclosure with which the software of a production system (of a printing system in particular) may be efficiently administered is explained in the following.

For the installation or updating, the software to be installed is broken down into individual software packages. In addition to the software component to be installed, information that further describes the software component— for example name, creator, version, short and long description, dependencies on other software components or software packages and/or hardware components, package signal, file list with checksums, register database values that are used, and environment variables—are included in such a software package.

If one software component is dependent on another software component or hardware component, it requires the installation of the other component in order to be executable.

The dependency of one software component on another software component or hardware component encompasses at least the presence of the other component. The version of the respective component may also additionally have an effect on the dependency, because a software component that is to be installed is dependent on other components with a predetermined version state.

An automatic check of these dependencies occurs before the installation of the software package via the method according to the exemplary embodiments of the disclosure in that such dependencies regarding components are extracted from the information that is included in the software package and then, for the respective component of the production system, a check is made as to whether the required components are installed on the production system or whether the software components are executable.

The check of the software components and hardware components installed on the production system can be implemented efficiently via the information that is stored in the network map and/or in the fingerprint of the respective component. From the network map or fingerprint (which have already been explained above), it may hereby be efficiently determined whether a software component and/or hardware component is present at the production system, as well as the versions of the components.

Dependencies hereby no longer need to be detected or resolved by hand by the installing service technician; rather, these are checked automatically before the installation upon execution of the method according to the disclosure.

If, upon checking the production system, it is established that a necessary component is not present, a warning message is then output to the control panel at the respective computer 10, 14, 15, 17, and the installation is terminated so that no changes have taken place.

As an alternative to the output of a warning, necessary software components are installed automatically before the installation of the software package (initiated by the installing service technician) is implemented. It is thereby ensured that the other software components that are required for a software component are present. The desired behavior given detected dependencies on software components can be predetermined insofar as it may be selected in advance at the control panel whether an installation is terminated without changes to the installed software given software components that are not present, or whether it is attempted to install the required software components in advance.

Via the system for software administration, it is thus not only the installation of software that is simplified and may be implemented efficiently; rather, the entirety of the software of the production system or the softwares of the production system that are dependent on one another can be automatically updated with little user interaction.

During a process of installing a software component and the prior installation of other software components on which the software component to be installed is dependent, all changes to the production system that are made by the installation routines are logged in order to be able to roll back the occurred software installation in the event of error (for example given the occurrence of an error in the installation or in the later operation of the production system) and to reestablish the initial state of the software of the production system.

All software components that can be executed at the production system can additionally be centrally administered via the method according to the disclosure. It is thereby easier to maintain the overview of the various software components. This is advantageous in particular since many different software components are present in the production system, in particular as firmware.

Via the recording of the changes made in a software installation, it is enabled to be able to quickly and simply revert to a previous software state for which it is known that the production system functions correctly with this software state.

Figure 22:
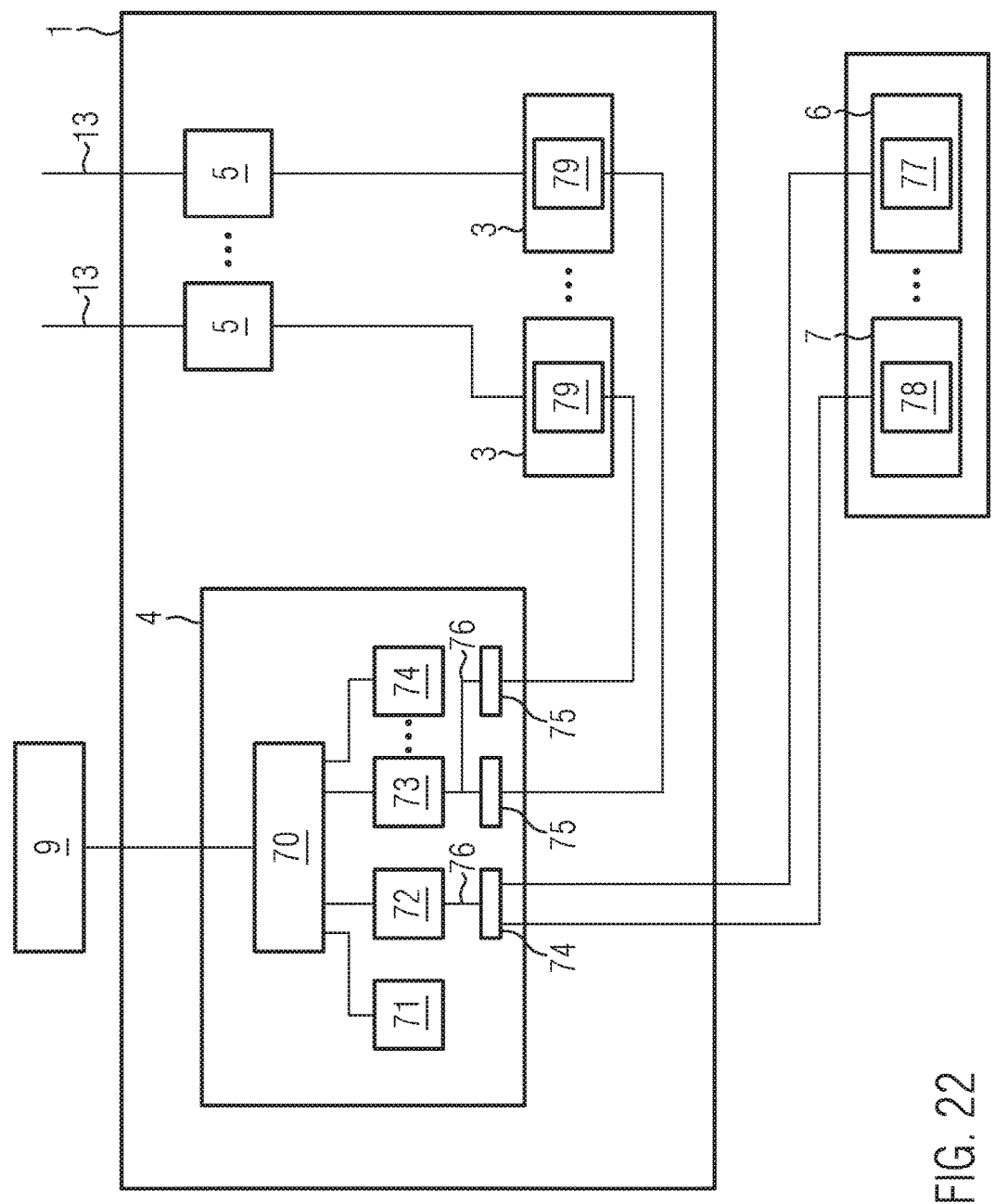
FIG. 22 illustrates a printing apparatus with paper transport unit according to an exemplary embodiment of the present disclosure.

With reference to FIG. 22, a first exemplary embodiment of a system for monitoring a production system (in particular a printing system) is explained in the following.

The printing apparatus 1 as well as the take-off 6 and the take-up 7 (which are shown in FIG. 2) are presented in more detail in FIG. 22. The devices or installations that are shown in FIG. 2 that are provided with the same reference characters hereby coincide with those in FIG. 22. The physically present connections that pertain to the system for monitoring a production system are additionally shown in FIG. 22.

The printing apparatus controller 4 comprises a DE-LAN 70, a main module 71, a DE assembly for the paper transport 72, one or more DE assemblies for the print group 73, and one or more printed circuit boards 74, 75. The main module 72, the DE assembly for the paper transport 72 and the one or more DE assemblies for the print group 73 are connected with the DE-LAN 70, which is connected with the internal LAN 9.

One or more printed circuit boards 74 are connected via a CAN bus 76 with the DE assembly for the paper transport 72. One or more printed circuit boards 75 are additionally connected via an additional CAN bus 76 with every single DE assembly for the print group 73. The printed circuit board for the paper transport 74 is connected with an actuator sensor for the take-off 77 which comprises the take-off 6, as well as with an actuator sensor for the take-up 78 that has the take-up 7. The one or more printed circuit boards for the print group 75 are connected with one or more actuator sensors for the print group 79.

The DE-LAN 70 enables the communication between the internal LAN 9 or the components connected with this and the main module 71, the DE assembly for the paper transport 72 and the one or more DE assemblies for the print group 73.

The DE assembly for the paper transport 72 controls the printed circuit board for the paper transport 74 or receives status data from this via the CAN bus 76. The printed circuit board for the paper transport 74 controls the actuator sensor for the take-off 77 and the actuator sensor for the take-up 78 or receives status data from these.

Via the respective connected CAN bus 76, each of the DE assemblies for the print group 73 controls the printed circuit boards connected with this for the print group 75 or receives status data from these. The printed circuit boards for the print group control the respective connected actuator sensor for the print group 79 or receive status data from these.

Monitoring program modules can be executed or are executed at the main computer 10 or at the computers 11, 12. The monitoring program modules detect the status data of the components and/or component groups of the printing system. Interfaces to the monitoring program modules at the respective computer 10, 11, 12 are provided by the web user interface plugins 30, such that it is enabled for the monitoring program modules to pass the status data to the web user interface plugins 30.

Additionally provided at the main computer 10 in the web user interface 21 is an evaluator 80 that accepts the status data from the respective web user interface plugins 30 and associates these as parameter values with respective defined parameters of a parameter set of the monitoring system (FIG. 6). Status data of different monitoring program modules may thereby be associated with the same parameters, such that it may occur that different parameter values that have been passed as status data from different monitoring program modules may be associated with a parameter.

The evaluator 80 is additionally designed to check the parameter values, wherein specific deviations are assessed as errors.

In an exemplary embodiment, the components of the printing system that are to be monitored by the evaluator 80 can include: the internal LAN 9; via the internal LAN 9, the computers 11, 12 and the DE-LAN 70; and via the DE-LAN 70, the main module 71, the DE assembly for the paper transport 72, as well as the one or more DE assemblies for the print group 73. Via the printed circuit boards 74, 75 and the actuator sensors 77, 78, 79, the print groups 3, the take-off 6 and the take-up 7 are additionally monitored by the evaluator 80.

Figure 23:
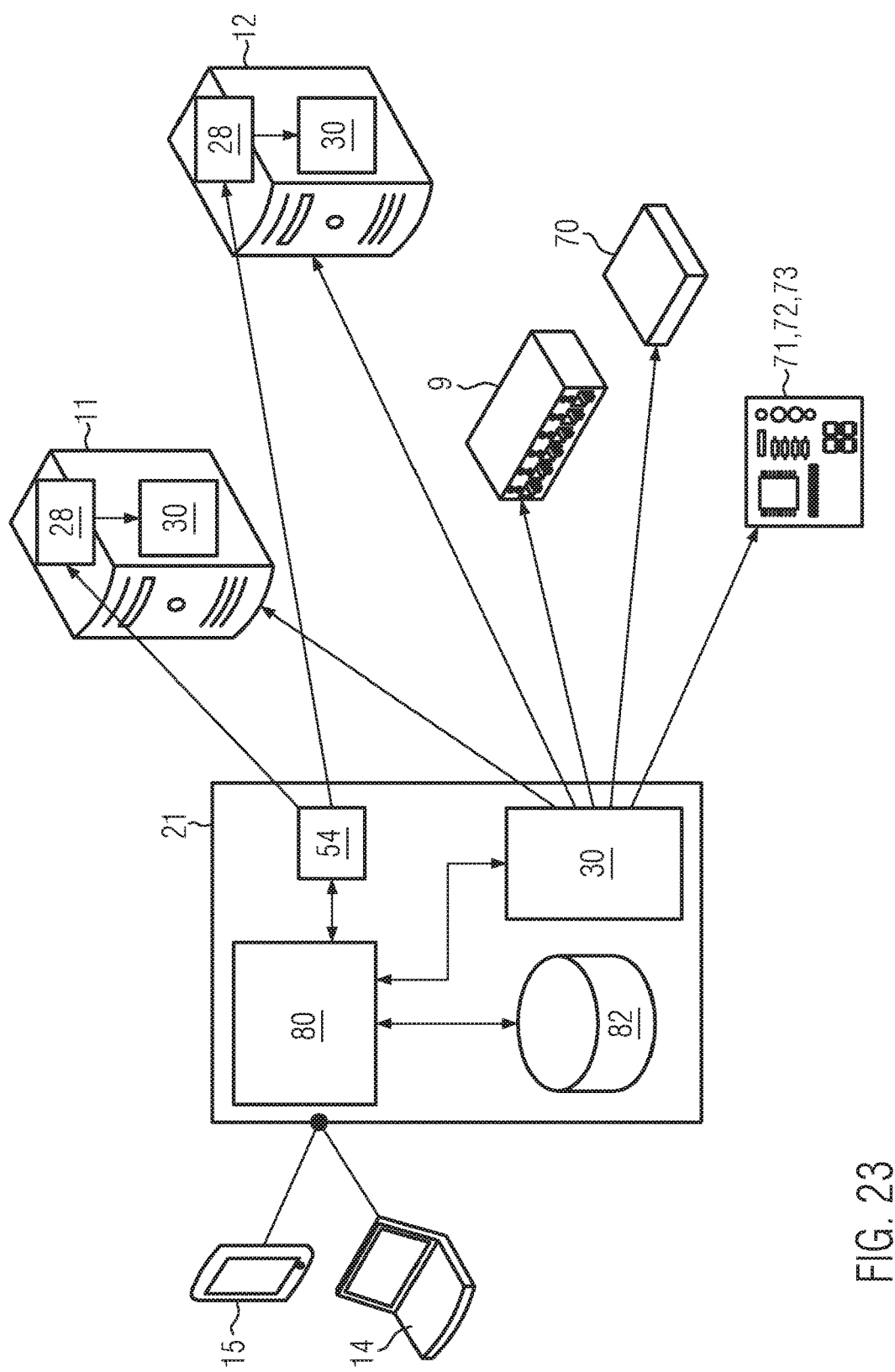
FIG. 23 illustrates components, devices, and installations of a printing system, including logical connections for monitoring the system according to exemplary embodiments of the present disclosure.

In the following and with reference to FIG. 23, the logical links or connections of a system for monitoring a production system are explained, which shows an embodiment of FIG. 2 and FIG. 22. The devices and installations shown in FIG. 23 have the same reference characters as those that are shown in FIGS. 2 and 22.

The monitoring of the components and/or of the application software of the production system is essentially implemented via various mechanisms that have different logical connections, as explained in the following.

In an exemplary embodiment, a first mechanism to monitor the production system is the monitoring of the raster computer 11 as well as the interface computer 12 via the IsMa service 54 of the web user interface 21. The IsMa service 54 is thereby logically connected with the respective infrastructure manager 28 that can be executed or is executed on any one of the raster computers 11 and any one of the interface computers 12.

The infrastructure manager 28 that is respectively executed on these computers 11, 12 is logically connected with the web user interface plugins 30 executed on the same computers 11, 12.

In an exemplary embodiment, the monitoring takes place such that the evaluator 80 sends a check command via the IsMa service 54 to the respective infrastructure manager 28 of one of the computers 11, 12. The respective infrastructure manager 28 relays the command to the web user interface plugins 30 of the respective computer 11, 12. The web user interface plugins 30 provide interfaces to the monitoring program modules, via which interfaces they receive their determined status data, as has already been explained above. The determination or receipt of the status data thereby takes place at predetermined points in time, i.e. periodically, as needed or—depending on the design of the respective monitoring program module—this may also be triggered via the provided interface.

The received status data are transmitted to the IsMa service 54 of the web user interface 21, which relays the status data to the evaluator 80 for additional processing.

In an exemplary embodiment, another mechanism for monitoring the production system is designed such that the evaluator 80 is connected logically with the computers 11, 12 via the web user interface plugins 30 at the main computer 10; with the internal LAN 9; with the DE-LAN 70 and the main module 71 connected via this: and via standardized network interfaces with the DE assemblies 72, 73 connected via these. Via these standardized network interfaces, the status data of the cited components are retrieved in that the evaluator 80 requests status data from the web user interface plugins 30 of the main computer 10. The web user interface plugins 30 of the main computer 10 relay this query via the standardized network interfaces to the respective component. The respective component returns the requested status data via the same path to the evaluator 80 for additional processing.

In an exemplary embodiment of the system for monitoring a production system (in particular a printing system), the evaluator 80 is designed such that it may access a component database 81 with which it is connected. Stored in the component database 81 are component data that describe the design of the component in modules for every component of the production system. A component is thereby made up of one or more modules, and a module is an exchangeable unit. The evaluator 80 is additionally designed such that, with the aid of the component data, it may associate occurred errors with the respective faulty modules.

In an exemplary embodiment, the configuration of the system for monitoring a production system preferably takes place by means of the predetermined control templates, which have already been explained above. Not only are the monitoring routines and control parameters that are specific to the respective component hereby configured, but also additional parts of the respective component, such as the web user interface plugins 30 and the web server services 51.

It may occur that different monitoring program modules which (as explained above) are provided with interfaces for passing status data have different methods in order to determine the same status data of one of the components and/or component groups. It hereby occurs that—due to the execution of these different methods for the determination of the same status data, i.e. the status data for the same parameters—the problem occurs (due to measurement errors or measurement tolerances) that the status data passed by the monitoring program modules enable contradictory conclusions as to whether an error is present or not. For example, it occurs that the parameter value of a monitoring program module exhibits a deviation that does not indicate an error while the parameter value of another monitoring program module for the same parameter of a parameter set of the monitoring system exhibits a deviation that indicates an error.

Therefore, all status data of the different monitoring program modules are initially stored, and all status data for an identical parameter are associated with this parameter, such that the status data determined with different methods may be processed further.

If one of the different parameter values transmitted for the same parameters now exhibits a predetermined deviation that is assessed as an error, then the evaluator 80 detects an error. It is thereby ensured that, for a detection of an error, it is sufficient if the evaluator 80 detects a predetermined deviation given at least one of the status data that can be associated with the same parameter. This means that the evaluator 80 then determines an error of the respective component and/or component group of the production system as a result if only one detected status datum exhibits a predetermined deviation.

The errors that are hereby detected by the evaluator 80 include component errors and/or errors of the application software of the production system.

In an exemplary embodiment, the evaluator 80 may additionally be designed to relay a detected error automatically to an external service organization for error correction. The evaluator 80 thereby generates an error report that it sends via e-mail, SMS, fax or another suitable communication channel. An external service organization may be quickly notified of an error via thus kind of automatic error report, such that an error correction is enabled efficiently and promptly. In particular, it is thereby possible for the external service organization to allocate the correction of the errors at different production systems efficiently to available service forces.

In an exemplary embodiment, the evaluator 80 can additionally be designed to associate an error priority for the error correction with a detected error according to predetermined criteria. The error priority thereby describes what influence the error has on the production process of the production system.

In an exemplary embodiment, the evaluator 80 preferably assesses a detected error as a warning or error of low error priority; error of medium error priority; or error of high priority. The error priority may also be subdivided differently into multiple levels.

The warnings or errors of a low error priority do not immediately negatively affect the operation of the production system. However, warnings may develop in the future such that a negative effect on the operation occurs due to an error.

For example, belonging among the warnings is the exceeding of a predetermined threshold that is below the number of minimum guaranteed write cycles of a solid state drive (SSD) with which the main computer 10 is provided. It is hereby possible to promptly suggest the impending exchange of the SSD or to exchange this promptly before reaching the number of minimum guaranteed write cycles.

An additional example of such a warning is a temperature value of a component in a boundary range that lies between a temperature range for normal operation and a temperature range that signals an error. Via a corresponding reaction to such a warning it may be avoided that the temperature continues to increase, since a temperature value that triggers an error of the production system may lead to a stoppage of the production system.

The reaching of a predetermined value of operating hours of a print head of an inkjet printing system may apply as an additional example of a warning. Such a print head has a guaranteed total number of operating hours in which the print head is provided to function without errors. If a predetermined value below this (relative to this number of guaranteed operating hours) is now exceeded, it is thus advantageous to generate a warning before the failure of the print head may be expected. A prompt exchange of the print head is thereby enabled before the expiration or at the guaranteed minimum operating duration.

The errors of medium error priority are errors that negatively affect the production operation but do not entirely prevent it.

One example of an error of medium error priority is a redundant hard disk array at the main computer 10, in which a failed hard disk causes a reduction of the data transfer rate. This problem may occur due to calculations that are then additionally necessary for reconstruction of the correct, originally stored data upon their readout from the hard disk array. Due to the reduction of the data transfer rate, the correct function of the production system continues to be provided but a lower data transfer rate may cause a lower production speed, since the data required for production are not provided in a timely manner.

The errors with high error priority are errors given whose occurrence the production operation may no longer be maintained.

An error of high error priority may, for example, be a total failure of a non-redundant component of the production system or of a component that is not present in multiple instances, wherein the component is indispensable to the operation of the production system (such as the main computer 10, which is part of the controller and as such controls the production system) or of one of the print groups 3.

In an exemplary embodiment, the evaluator 80 provides the error messages with an error priority and relays them to the external service organization responsible for error correction the possibility results to efficiently allocate service forces present for error correction to the correction of the errors of the corresponding individual error messages.

Errors with high error priority are accordingly given preference, and available service forces are initially used for their correction. Only when the errors with high error priority have been handled is the correction of errors of medium or low error priority or of warnings of the same or of other production systems executed. A more efficient production operation is thereby ensured, even given a plurality of production systems overseen by the service organization.

In an exemplary embodiment, the evaluator 80 is preferably designed to pass the errors that have occurred at the production system to the control panel module library 20 in an error list that includes parameters describing the errors. The control panel module library 20 may thereby generate from the passed error information a markup language file that presents a control panel and may be displayed in the browser 22, 23, wherein the control panel includes the presentation of the error list.

The error list includes the detected errors with associated information such as time stamp, error location, component, module, error type, error priority, error frequency, error certainty and additional information describing the errors.

It is thereby enabled to display the component groups, the modules, the status data, the parameters and/or the parameter sets together with the respective errors at the control panel on the computer 14, 15, 17. The operator at the control panel thus receives an overview of the production system, and in particular of the errors that have occurred in the production system.

For the display, the control panel module library 20 generates a structured—in particular hierarchical—presentation that is preferably formed as a graphical presentation. The structure that is hereby presented represents the network map or a section thereof.

In the structured presentation in the form of the network map, the components and/or component groups that exhibit an error may be marked or emphasized. In the overview of the production system with associated network, it is thereby enabled for a user at the control panel to be informed of errors that have occurred.

From the network map, components, component groups and modules can be presented in a more detailed display via interaction of the operator. Via such an interaction, the navigation across the various logical levels of the production system is enabled, meaning that the operator may switch the display at the control panel back and forth between the various logical levels. A display as it is presented in FIG. 1—i.e. the entire production system is displayed at the control panel—may hereby occur as an uppermost logical level. With this it is enabled that it is possible in an overview of the production system to efficiently identify parts of the production system that exhibit errors.

One example of this is a server cabinet or rack emphasized in color (preferably marked red) in the presentation of the production system due to an error, on which server cabinet or rack the user clicks, after which the display changes such that the components or rack modules included in the server cabinet or rack (such as servers etc.) are displayed on the control panel, wherein the faulty component (for example one of the servers) is likewise emphasized in color. The modules that the component comprises are in turn indicated as the next-lowest level by clicking on this component, wherein the faulty module (for example a hard disk module of the server) is in turn displayed with emphasis in color. A new click on the faulty module opens (as a next-lowest level) a display in which additional module data (for example hard disk parameters) are displayed, wherein the module datum exhibiting the error is marked with a color emphasis. Naturally, the user may not only navigate in the display from the higher level to the lower level but also from a lower level to a higher.

In an exemplary embodiment, the evaluator 80 may additionally be designed to determine from at least one of the detected errors a setting of the production system in which the influence of the error on the production process is minimized or entirely negated. The evaluator 80 thereby passes data that describe the modified configuration after a reconfiguration to the control panel module library 20, such that said control panel module library 20 may generate from these a markup language file that can be presented in the browsers 22, 23 as a control panel with the information for reconfiguration. This serves to inform the operator or the service technician that the error may be corrected.

One example of a manual configuration that is to be implemented by an operator or service technician after corresponding display in the control panel is the re-plugging of a network connection from a faulty network port of the internal LAN (switch) 9 to a network port that does not exhibit any errors.

In addition to the determination of a setting of the production system upon occurrence of an error, the evaluator 80 may be designed to relay configuration data for reconfiguration of the production system to the infrastructure manager 28 to automatically reconfigure the production system. Via this automatic adjustment of the production system, components, application software and/or the production system may be reconfigured accordingly.

In an exemplary embodiment, an automatic reconfiguration that is implemented by the infrastructure manager 28 is, for example, the reduction of the production speed of the production system, in particular the reduction of the print speed of a printing system if sufficient computing capacity in order to provide the data required for the current production speed at the corresponding time is no longer present due to a faulty component. In the explained printing system, this pertains in particular to a failure of one of the multiple present raster computers 11. The infrastructure manager 28 then configures the printing system such that print data to be rastered are no longer relayed to the one faulty raster computer 11 but rather are allocated to the other, correctly functioning raster computers 11 for further processing.

If, after the reconfiguration by the infrastructure manager 28, it should occur that the computing power of the correctly functioning raster computers 11 is not sufficient for the rastering of the print data, in a further step the infrastructure manager 28 may then instruct the raster computers 11 to raster the print data at a lower print resolution. The expenditure—and therefore the necessary computing time—for the rastering of the print data is reduced via the use of such a lower resolution.

Alternatively or additionally, given an error of one of the raster computers 11 the infrastructure manager 28 may reduce the print speed in that it decreases the transport velocity of the recording medium 120 to a value that enables the continued printing without spoilage.

In other error situations, different or additional parameters may also be automatically adjusted or affected by the infrastructure manager 28 for the correct operation of the production system.

In an exemplary embodiment, for further evaluation of the errors, the error list explained above may be transmitted from the evaluator 80 to an external evaluation organization upon reaching a predetermined error count, at predetermined time intervals or as needed. Via such a transmission, information about the quality and compatibility of individual hardware and software parts of the production system can be determined from the error lists of a plurality of different production systems. Such an evaluation normally takes place according to statistical methods at the external evaluation organization.

In an exemplary embodiment, the evaluator 80 may additionally be designed to determine an error certainty for the detected errors. The error certainty thereby indicates how high the probability is that an error has actually occurred or not. The error certainty may be transmitted from the evaluator 80 to an external service organization in the error message, be stored in the error list and be transmitted to an external evaluation organization and/or be taken into account for a reconfiguration of the production system. If the error certainty is linked with the error priority, a more precise estimation is enabled as to whether and when a service, maintenance or a reconfiguration needs to take place in the production system.

The error certainty for a detected error may be determined under consideration of one or more of the following strategies in combination with one another:

check the reliability of the parameter value triggering the error via comparison with parameter values of other monitoring program modules, wherein the parameter values of other monitoring program modules are either associated with the same parameters are have a logical relation to the parameter value triggering the error, wherein the comparison includes a weighted assessment of the different parameter values, check the reliability of the parameter value triggering the error under consideration of measurement errors and/or measurement tolerances, and/or determine the error frequency and/or the stability of the error.

Parameter values having a logical relationship with one another are those given which the parameter values are linked with one another since they originate from status data that have the same basic data or have basic data having a logical connection with one another. Such a logical relationship is, for example, present given sensors that detect as a status datum the same physical value at different positions of the production system.

In an electrophoretic printing system according to an exemplary embodiment, one example of such sensors is the presence of different temperature sensors in the region of the fixer 130, in which the toner is fixed to the recording medium 120 under the effect of heat. The temperature sensors hereby measure the temperature at different points of the fixer 130, wherein there are temperature sensors that are arranged in thermally contiguous regions of the fixer 130 and determine temperature values there. The temperature values that are thereby determined therefore have a logical relationship with one another.

Due to the logical connection, the temperature values of one temperature sensor can be concluded from the temperature values of another temperature sensor that is logically connected with this. Although temperature values do logically correlate, they have exhibit a deviation from one another that is due to the different positions of the temperature sensors and the temperature gradient between these that result from these different positions. Given the establishment of a predetermined deviation using which an error is detected, it is therefore appropriate to also take into account those deviations of measurement values that occur even given a correct functioning of the printing system.

If one of the temperature sensors that are logically linked with one another now shows a deviation that the evaluator 80 assesses as an error, another temperature sensor that is logically connected with this may be used to check the error certainty.

An additional example of sensors that detect as a status datum the same physical value at different positions of the production system are in particular sensors arranged in the printing system that measure the velocity of the recording medium 120. In that this recording medium 120 is a continuous printable medium, the different velocity values that are determined by such sensors have a logical connection since they detect the same physical parameter of the recording medium 120.

The velocity sensors are preferably arranged in a predetermined order at various points of the path that the recording medium 120 takes through the printing system. In the determination of the error certainty of an error of the transport of the recording medium 120, the evaluator 80 takes into account not only the possibility of the occurrence of slight deviations of the recording medium velocity measured by the individual sensors, but also the order of the sensors within the printing system. The evaluator 80 may thereby determine the probabilities for an error of such a sensor and of an error of the transport of the recording medium 120, for example a tear of the recording medium 120.

In principle, deviations of logically connected parameter values may occur due to assembly tolerances, measurement tolerances, different measurement methods etc. Given specific sensors, the positions at which these are arranged and/or their alignment may also cause deviations.

In an exemplary embodiment, the evaluator 80 may assess additional different parameter values with varying weighting, wherein the weighting is equally distributed in the simplest case. However, the evaluator 80 may also allocate a higher weighting to the status data of specific monitoring program modules than those of other monitoring program modules. It is thereby enabled for the evaluator 80 to allow status data of monitoring program modules that have a higher precision to have a higher proportional influence in the evaluation of the error certainty than other status data that are less precise. The evaluator 80 thereby minimizes the effects of deviations between different moms or their status data.

Via a corresponding weighting, the evaluator 80 also has the possibility to preferably incorporate the parameter values of a monitoring program module into the determination of the error certainty in the event that no unambiguous error certainty can be determined from the parameter values of multiple monitoring program modules. For this, one of the monitoring program modules that transmit the same status data or status data that are logically linked with one another is labeled as a master. The other monitoring program modules transmitting the same status datum are designated as slaves. In the event that the parameter values that are passed for a status datum now differ between the master and the slaves, such that no unambiguous error certainty may be determined, the evaluator 80 thus takes only the status datum of the master into account to determine the error certainty, wherein the status data of the slaves play no role in the determination of the error certainty. The master is thereby preferably a mom that supplies more precise parameter values than the slaves.

By means of a corresponding weighting, given deviations from one another of status data that are logically linked with one another, the evaluator 80 may additionally be designed to take into account the plurality or the majority of the statements of the deviations of the individual parameter values in the determination of the error certainty.

If the status data of various monitoring program modules that have a logical relationship with one another are present in the evaluator 80, the evaluator 80 may then determine the error certainty in that it calculates the ratio between the number of monitoring program modules whose status data indicate an error and the total number of monitoring program modules that transmit the corresponding logically linked status datum. This ratio then corresponds to the error certainty.

In an exemplary embodiment, the evaluator 80 may additionally be designed such that it also takes into account measurement tolerances of a monitoring program module for the calculation of the error certainty in that it compares the deviation of a transmitted status value with the estimated deviation caused by the measurement tolerance.

Given monitoring program modules that exhibit greater measurement tolerances, the error certainty is to be assumed to be smaller than given monitoring program modules that transmit more precisely determined status values.

In an exemplary embodiment, the evaluator 80 may additionally be designed such that it also takes into account the frequency of the occurrence of an error and/or the constancy or permanence of the error to determine an error certainty. If the evaluator 80 detects an error often or continuously, its error certainty is thus greater than if it is detected less often.

The different strategies explained above for determining the error certainty may also be combined with one another.

In an exemplary embodiment, the evaluator 80 may also be realized as a software module within the web server services 51. Such a realization is shown as an evaluation module 82 in FIG. 7. The evaluation module 82 thereby executes the functions of the evaluator 80 as explained above.

An exemplary embodiment of a system for presenting control devices in a production system—in particular in a printing system—is explained in the following.

Figure 24:
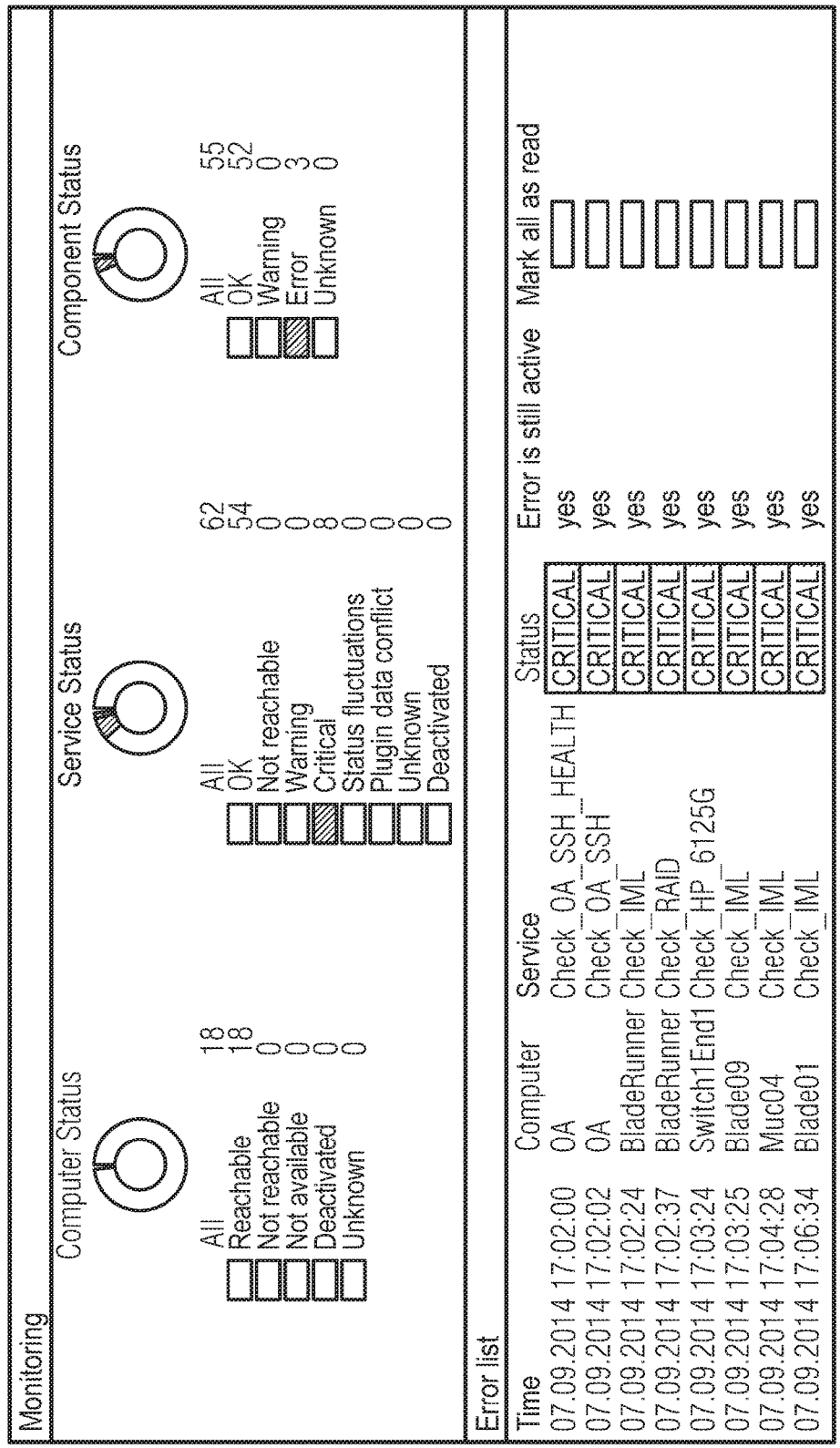
FIG. 24 illustrates a display of the states of hardware and software of a production system with an associated error list according to an exemplary embodiment of the present disclosure.

With reference to FIG. 24, in the display of an overview of the production system, the states of the hardware and software of the production system are indicated at the control panel as well as in an error list for this, in the form of a tabular list.

In addition to the state of the computers, the state of the services as well as the state of the components of the production system are displayed in a graphical presentation. The respective state display is provided with a legend for the various states, in particular for the various error types and error priorities. The states of the production system, in particular whether and which errors have occurred, can be efficiently recognized via such a graphical presentation.

Additional information regarding the occurred errors is indicated in the error list shown below. Displayed here in particular are the time stamp, the location, the service connected with the error, the error priority, and whether the error is still active.

The display of the error list may be affected by the user via specification of display settings at the control panel. In particular, the columns displayed in the tabular presentation may be preset or their display may be determined.

Information regarding occurred errors can be specifically composed from the error list according to defined criteria and presented at the control panel. Not only can the columns already explained above be displayed, but rather additional columns whose information is connected with the hardware and/or software of the production system. Examples of such information are: the operating time; the downtime; the point in time of the last check; the response time; additional network statistics and network information; the execution time; the required time: the response status; additional information connected with the service status; the definitions of the templates used by the monitoring system: and information connected with these.

The critical errors presented in FIG. 24 are the errors with high error priority as explained above.

Figure 25:
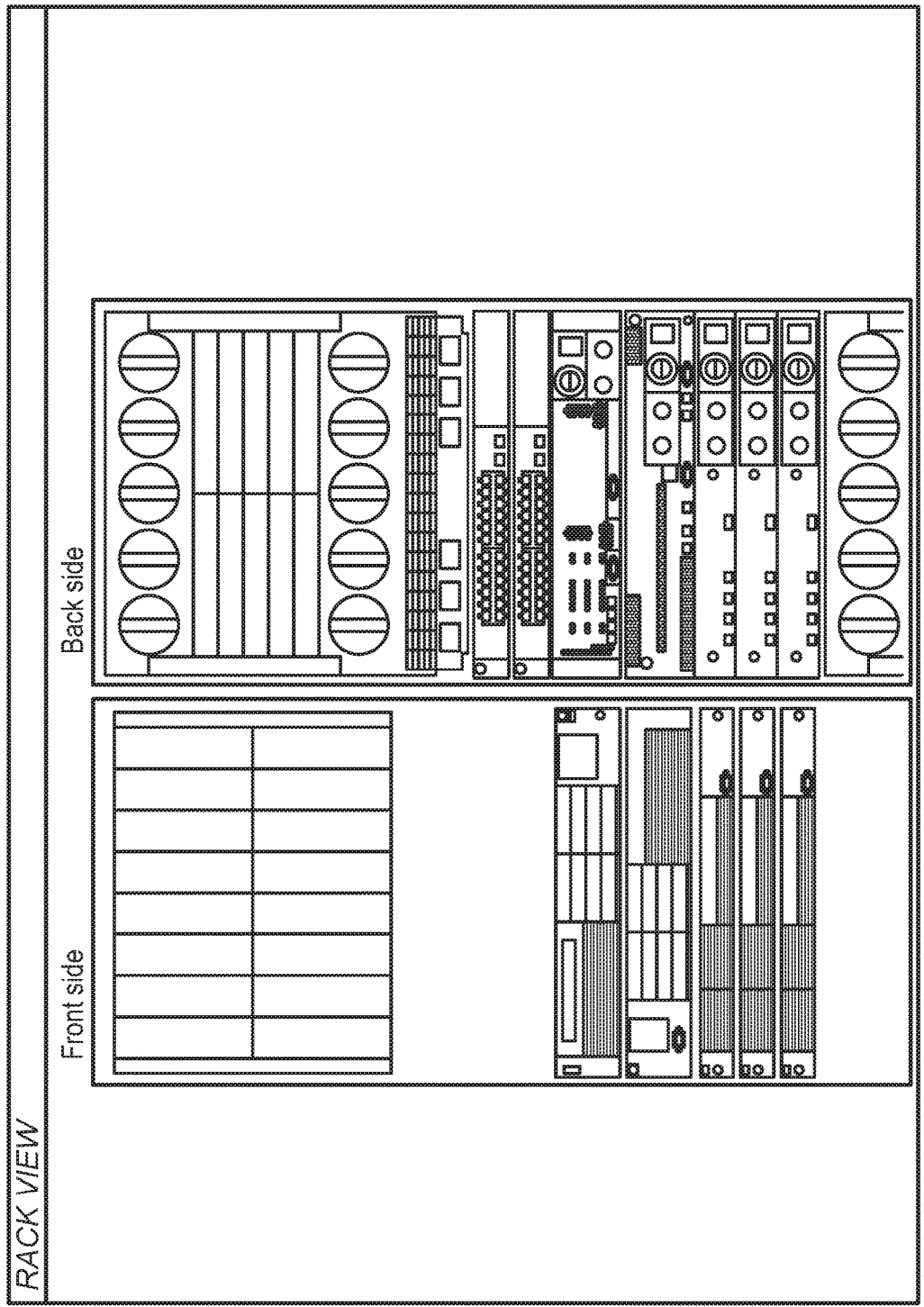
FIG. 25 illustrate a display of a rack presentation according to an exemplary embodiment of the present disclosure.

The display of a rack presentation at a control panel is shown in FIG. 25, wherein this display is generated by a rack presenter. A rack 1 is hereby displayed with front side and back side.

In the respective presentation of the front side or back side of the rack, rack module presentations are visible that respectively show a map of one of the rack modules. The rack module presentations are arranged at the location in the rack presentation that corresponds to the real location of the corresponding rack module.

If an error now occurs in a rack module, this error may be indicated via a change in the rack presentation or rack module presentation.

There is hereby the possibility that one or more of the rack module presentations has an error display means that corresponds to an error indicator device of the corresponding rack module and with which, given the presence of a corresponding error, this can be similarly presented at the error display device. For example, a hard disk that a rack module shows has an LED with which, given occurrence of an error, this is displayed at the hard disk, and thus is designed as an indicator display device. If the LED now indicates an error, this error in the rack module presentation of the hard disk is then indicated at the associated error indicator device of the rack module presentation that corresponds to the hard disk.

The error indicator means is hereby a separate software unit that overlays the depiction of the rack module presentation. Upon occurrence of an error, it is not the rack module presentation itself that is hereby modified but rather only the presentation of the error indicator means.

Upon occurrence of an error, it is accordingly thereby enabled to transfer only the information that modifies the presentation of the error indicator means to the client computer that displays the rack presentation at its control panel.

Alternatively or additionally, the rack presenter for at least one rack module includes two different rack module presentations. One of the two rack module presentations hereby displays the rack module in normal operation, and the other displays the rack module in an error operation. In the error case, the rack module presentations are thus exchanged, wherein the rack module presentation for the error case is designed so that the error is perceptible. For example, this may be presented in that a specific fault light (that glows red in the event of error, for example) is correspondingly shown red in the rack module presentation. An error may herewith also be established or presented that is not visible in the real rack. For example, if the real rack module is defective and has no error indicator device, in the event of error the rack module may then be provided with a corresponding warning color (in particular the color red).

The rack presentation may simultaneously be displayed at multiple control panels that are presented at the client computers 14, 15, 17, even across large distances.

The client computers 14, 15, 17 may in particular be designed as mobile devices with a mobile data connection to the main computer 10. Provided with such a mobile device, an operator or service technician may change his position and thus move around the rack for error correction, wherein at the control panel he receives a display of the front side and back side of the rack in the rack presentation with the occurred errors.

If one of these mobile devices has an environment sensor that detects the position and/or the alignment of the respective client computer 14, 15, 17, with the aid of this information the rack presenter then displays the respective rack presenter of the rack at the control panel that is located closest to the mobile device and/or in the field of view of the operator of the mobile device. Given a movement of the mobile device, the rack presenter hereby automatically changes the presentation according to the criteria "next rack" and/or "rack in the field of view", in particular between different racks.

The rack module presentations of the individual rack modules are created as a graphic template (possibly with error indicator means) before delivery of the production system and are stored in said production system. As a rack module presentation, such a graphic template presents a front side or a back side of a rack module.

The rack view or rack module view can be configured for the respective production system. This configuration can be implemented such that the respective graphic template of the rack module presentation in the rack presentation is placed at the corresponding position at which the rack module is actually located in the rack. This position of the rack module presentation is stored together with a link to the graphic template of the rack module. The positioning of a graphic template may take place via a configuration file or be implemented in a graphical editor.

The network map generated beforehand via the scanning is hereby used as a basis for the graphical editing. The network map provides the individual components, switches, rack modules etc. of the production system. The graphical editor is accordingly designed such that it has an import function for the network map. After a network map has been imported into the graphical editor, the graphical editor accordingly shows corresponding graphic templates for the components, switches, rack modules etc. of the production system. The user only still needs to correspondingly position these displayed graphic templates.

In order to assist the positioning of the graphic templates, an indication of a configuration signal at the respective component may be triggered by the user in a graphical editor. For example, the configuration signal is a blinking LED at a component to be placed for the presentation. The user may trigger the display of the configuration signal at one such component so that it may identify the actual position of the component in the rack. An efficient and error-free arrangement of the graphic template is thereby enabled. If the user has identified the respective component using the configuration signal, he then rescinds the indication of the configuration signal of the corresponding component in the graphical editor.

Upon creation of a configuration file it is sufficient to indicate the real position of the rack module in the rack. Given use of the graphical editor, it is sufficient to place the rack module presentation of the front side at the corresponding position of the rack presentation. In each case, the rack module presentation of the back side in the rack presentation takes place automatically using the position information determined via the positioning of the rack module presentation of the front side.

A presentation of an individual rack in an overview (which shows the entire production system or portions thereof) can be switched to via user interactions, for example mouse actions. Similarly, via user interactions a single rack module from the rack presentation can be presented in more detail in that the rack module presentation of the selected rack module is displayed enlarged or alone in the control panel.

The disclosure concerns a method and a device for configuration of a control device for a production system, in particular for a printing system. The production system thereby comprises multiple components that respectively have a client computer (4, 5, 14, 15, 17), which client computers are connected via data connections with a main computer (10). The method thereby includes the steps:
- scan the individual components connected to the data network,
- create a network map using the scanned information, wherein the network plan includes the main computer (10), the data connections and the components,
- configure the control device according to the specifications of the created network map, wherein monitoring routines that are specific to the respective components are executed.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, a computer can include one or more circuits, one or more processors, logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. In one or more exemplary embodiments, the processor can include a memory, and the processor can be "hard-coded" with instructions to perform corresponding function(s) according to embodiments described herein. In these examples, the hard-coded instructions can be stored on the memory. Alternatively or additionally, the processor can access an internal and/or external memory to retrieve instructions stored in the internal and/or external memory, which when executed by the processor, perform the corresponding function(s) associated with the processor, and/or one or more functions and/or operations related to the operation of a component having the processor included therein.

In one or more of the exemplary embodiments described herein, the memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 printing apparatus
2 controller
3 print group
4 printing apparatus controller
5 print group controller
6 take-off
7 take-up
8 print server
9 internal LAN (switch)
10 main computer
11 raster computer
12 interface computer
13 optical waveguide
14 control panel computer
15 service computer
16 router
17 service computer
18 printer control panel computer
19 remote servicing (control) module
20 control panel module library
21 web user interface
22 browser
23 browser
24 web socket
25 web socket
26 operating system
27 function code
28 infrastructure manager
29 web user interface database
30 web user interface plugins
31 trace module
32 DE agent
33 RMI server
34 ORS agent
35 trace agent
36 web server module
37 system parameter manager
38 SEA agent
39 OP master
40 UIC agent
41 TR file collector
42 Ops-PAC
43 RDP agent
44 error agent
45 CDC agent
46 web server
47 framework
48 program code
49 external plugins
50 external libraries
51 web server services
52 views
53 monitoring structures
54 IsMa service
55 menu service
56 push helper service
57 RMI service
58 scheduler service
59 (scripting) programming language module
60 markup language module
61 document access interface
62 design language module
63 print group control driver
64 main module
65 paper transport module
66 a printing unit module
67 SNMP service
68 control panel user interface
69 service module
70 DE-LAN (switch)
71 main module
72 DE assembly for paper transport
73 DE assembly for print group
74 printed circuit board for the paper transport
75 printed circuit board for the print group
76 CAN bus
77 actuator sensor unit for the take-off
78 actuator sensor unit for the take-up
79 actuator sensor unit for the print group
80 evaluator
81 component database
82 evaluation module
111, 111a-111d print group (front side)
112, 112a-112d print group (back side)
120 recording medium
121 roll (input)
123 conditioning group
124 turner
125 register
126 puller
128 roll (output)
130 fixer
140 climate controller 150 power supply
170 fluid management
171 fluid controller
172 reservoir

What is claimed is:

1. A method to configure a controller for a production system including multiple components that respectively include a client computer connected via data connections of a data network with a main computer, the method comprising:
   scanning of the components connected to the data network to obtain scanned information;
   creating a network map using the scanned information, the network map including the main computer, the components, and a topology of the data network, wherein the topology includes one or more of the data connections between the main computer and the components, and one or more of the data connections between two or more of the components; and
   configuring the controller based on the topology of the created network map, the controller being associated with monitoring routines that are adaptively adjusted based on the topology and that are specific to the respective components being executed,
   wherein, upon the scanning of the components, operating system functions at the client computers are exclusively called so that software modules specifically for the scanning must not be present at the client computers.

2. The method according to claim 1, further comprising:
   upon the scanning of the components, determining basic information of the components; and
   determining detail information of the components, wherein a communication with the components via the data connections is performed using the determined basic information to determine the detail information.

3. The method according to claim 1, further comprising:
   configuring a control panel according to the specifications of the created network map.

4. The method according to claim 1, wherein the configuration of the controller is created using predetermined templates for the components of the production system, the templates being associated with corresponding ones of the components using component-specific identifiers.

5. The method according to claim 4, further comprising:
   identifying a component of the components as an unknown component if the scanning does not detect a template of the predetermined templates corresponding to the component.

6. The method according to claim 5, wherein a routine for analysis of an unknown component is implemented after identification of said unknown component.

7. The method according to claim 5, further comprising:
   terminating the data connection to the unknown component.

8. The method according to claim 1, further comprising:
   automatically examining the data network to detect network conflicts; and
   automatically correcting the detected network conflicts.

9. The method according to claim 1, wherein the scanning of the components is executed by web user interface plugins arranged at the main computer and/or the configuration of a web user interface that is executed at the main computer.

10. The method according to claim 1, wherein the scanning of the components is executed repeatedly.

11. The method according to claim 10, wherein network maps are repeatedly created using respective scanned information obtained from the repeatedly executed scanning of the components, and wherein the method further comprises storing the repeatedly created network maps.

12. The method according to claim 1, wherein the controller is configured to read out operation-specific parameters at the components to monitor the components, analyze the parameters and/or provide additional applications.

13. The method according to claim 2, wherein the basic information comprises one or more of: one or more MAC addresses, one or more ARP lists, a presence of remote maintenance functionality, one or more switch ports, and one or more component IDs.

14. The method according to claim 1, wherein the production system is a printing system.

15. A production system, comprising multiple components that respectively include a client computer, the client computers being connected via data connections with a main computer, and a computer-readable storage medium that stores instructions, that when executed by the main computer, control the main computer to perform the method of claim 1.

16. The method according to claim 1, wherein the method further comprises:
   adapting the network map to identify one or more components associated with one or more detected errors; and
   adapting the identified one or more components based on the adapted network map to reduce influence of the one or more detected errors on the production system.

17. The method according to claim 1, wherein the components comprise at least one of: one or more print groups, one or more conditioning groups, a turner, a fixer, a climate controller, a fluid controller, a print group controller, a raster computer, and an interface computer.

18. The method according to claim 1, wherein the network map further comprises one or more physical locations of one or more of the components within the production system or one or more physical locations of a hardware sub-component of the one or more components within the one or more components.

19. The method according to claim 1, further comprising:
   adaptively adjusting the network map based on a detected physical location and/or alignment information of a client computer with respect to a corresponding one of the components or with respect to a detected physical location and/or alignment information of a hardware sub-component of the corresponding one of the components.

20. The method according to claim 1, further comprising:
   associating the components with respective templates based on the scanned information, each of the templates including a monitoring routine of the monitoring routines associated with the controller,
   wherein the controller is configured based on the topology of the created network map and the templates of the respective components being executed.

21. A method to configure a controller for a printing system including multiple components that respectively include a client computer connected via data connections of a data network with a main computer having scanning specific software modules, the method comprising:
   scanning, by the main computer, the components connected to the data network to obtain scanned information;
   creating, by the main computer, a network map based the scanned information, the network map including the main computer, the components, and a topology of the data network, wherein the topology includes one or more of the data connections between the main computer and the components, and one or more of the data connections between two or more of the components;

configuring the controller based on the topology of the created network map, the controller being associated with monitoring routines that are adaptively adjusted based on the topology; and upon the scanning of the components, controlling the client computers to exclusively call operating system functions.

22. A method to configure a controller for a production system, the production system including multiple components that respectively include a client computer connected via data connections of a data network with a main computer, the method comprising:

scanning of the components connected to the data network to obtain scanned information;

creating a network map using the scanned information, the network map including the main computer, the components, and a topology of the data network, wherein the topology includes one or more of the data connections between the main computer and the components, and one or more of the data connections between two or more of the components; and configuring the controller based on the topology of the created network map, the controller being associated with monitoring routines that are adaptively adjusted based on the topology and that are specific to the respective components being executed, wherein, upon the scanning of the components, messages transmitted via the data connections are analyzed exclusively so that software modules specifically for the scanning must not be present at said client computers.

* * * * *